(12) United States Patent
Pointeau

(10) Patent No.: US 10,888,189 B2
(45) Date of Patent: Jan. 12, 2021

(54) ADAPTIVE PARCEL LOCKER AND RELATED SYSTEMS AND PROCESSES

(71) Applicant: NEOPOST TECHNOLOGIES, Bagneux (FR)

(72) Inventor: Stéphane Pointeau, Cavaillon (FR)

(73) Assignee: QUADIENT TECHNOLOGIES FRANCE, Bagneux (FR)

( * ) Notice: Subject to any disclaimer, the term of this patent is extended or adjusted under 35 U.S.C. 154(b) by 156 days.

(21) Appl. No.: 16/249,428

(22) Filed: Jan. 16, 2019

(65) Prior Publication Data

US 2019/0231105 A1 Aug. 1, 2019

(30) Foreign Application Priority Data

Jan. 31, 2018 (EP) ..................... 18305096

(51) Int. Cl.
*A47G 29/14* (2006.01)
*G07C 9/00* (2020.01)
(Continued)

(52) U.S. Cl.
CPC ........... *A47G 29/141* (2013.01); *A47G 29/20* (2013.01); *E06B 9/08* (2013.01); *E06B 9/58* (2013.01); *E06B 9/70* (2013.01); *G06Q 10/08* (2013.01); *G07C 9/00896* (2013.01); *A47G 2029/149* (2013.01); *G07C 2009/0092* (2013.01)

(58) Field of Classification Search
CPC .. A47G 29/141; A47G 29/20; A47G 29/1201; A47G 29/124; A47G 29/16; A47G 2029/149; E06B 9/08; E06B 9/58; E06B 9/70; G06Q 10/08; G07C 9/00896;
(Continued)

(56) References Cited

U.S. PATENT DOCUMENTS 693,770 A * 2/1902 Wright et al. ..... A47G 29/1209
232/17
6,323,782 B1 * 11/2001 Stephens .................. G07C 9/27
340/10.31
(Continued)

FOREIGN PATENT DOCUMENTS

EP 2 950 282 A1 12/2015

OTHER PUBLICATIONS

European Search Report for European Application No. EP 18 30 5096, dated Jul. 2, 2018, 2 pages.

*Primary Examiner* — William L Miller
(74) *Attorney, Agent, or Firm* — Cozen O'Connor

(57) ABSTRACT

An electronic parcel locker comprising an outside enclosure constituted of two side panels, of a bottom panel, of a top panel and of a back panel fastened together and defining a front aperture of the electronic parcel locker, and an internal structure for supporting parcels deposited in the electronic parcel locker, the internal structure being constituted of an array of bars with a same length regularly aligned essentially perpendicularly to the back panel and selectively movable between extended positions where a front end of the array of bars is aligned with the front aperture of the electronic parcel locker, and retractable positions where the bars of the array of bars corresponding to shapes of parcels to be deposited in said electronic parcel locker are retractable towards the back panel for defining temporary compartments exactly adapted to shapes of the parcels.

15 Claims, 9 Drawing Sheets

(51) Int. Cl.
*E06B 9/08* (2006.01)
*E06B 9/58* (2006.01)
*A47G 29/20* (2006.01)
*E06B 9/70* (2006.01)
*G06Q 10/08* (2012.01)

(58) Field of Classification Search
CPC ............... G07C 2009/0092; B65D 25/04; B65D 25/06; B65D 21/08
USPC .......... 232/19, 24, 25, 38, 45; 340/569; 220/529, 530, 534, 551
See application file for complete search history.

(56) References Cited

U.S. PATENT DOCUMENTS

| | | | |
|---|---|---|---|
| 10,624,484 B1* | 4/2020 | Mountford | A47B 57/583 |
| 2013/0264381 A1* | 10/2013 | Kim | A47G 29/122 |
| | | | 232/24 |
| 2016/0066732 A1* | 3/2016 | Sarvestani | G07F 17/12 |
| | | | 232/24 |
| 2019/0261802 A1* | 8/2019 | Vernal | A47G 29/14 |
| 2019/0320834 A1* | 10/2019 | Tovey | G07C 9/00896 |
| 2020/0107664 A1* | 4/2020 | Yang | A47G 29/30 |
| 2020/0172337 A1* | 6/2020 | Wilkinson | B65G 1/137 |

* cited by examiner

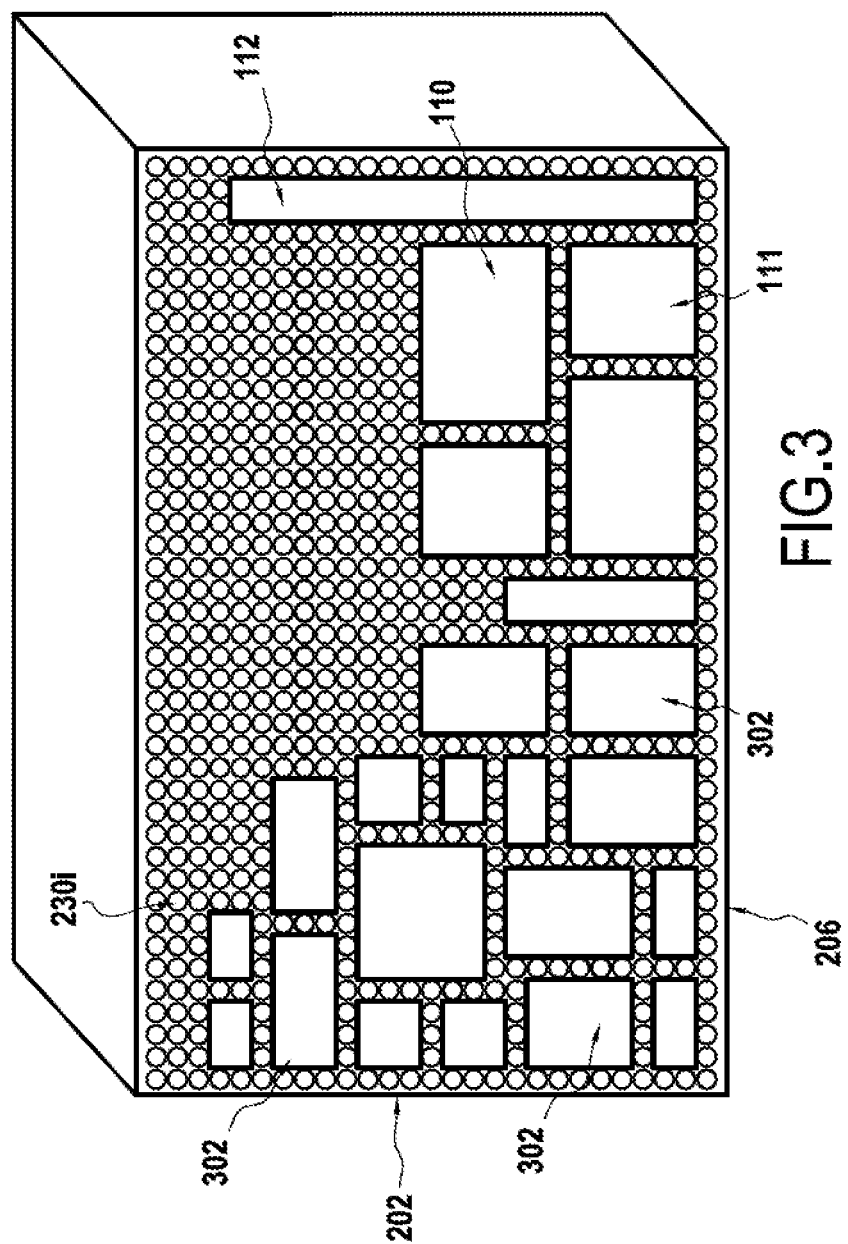

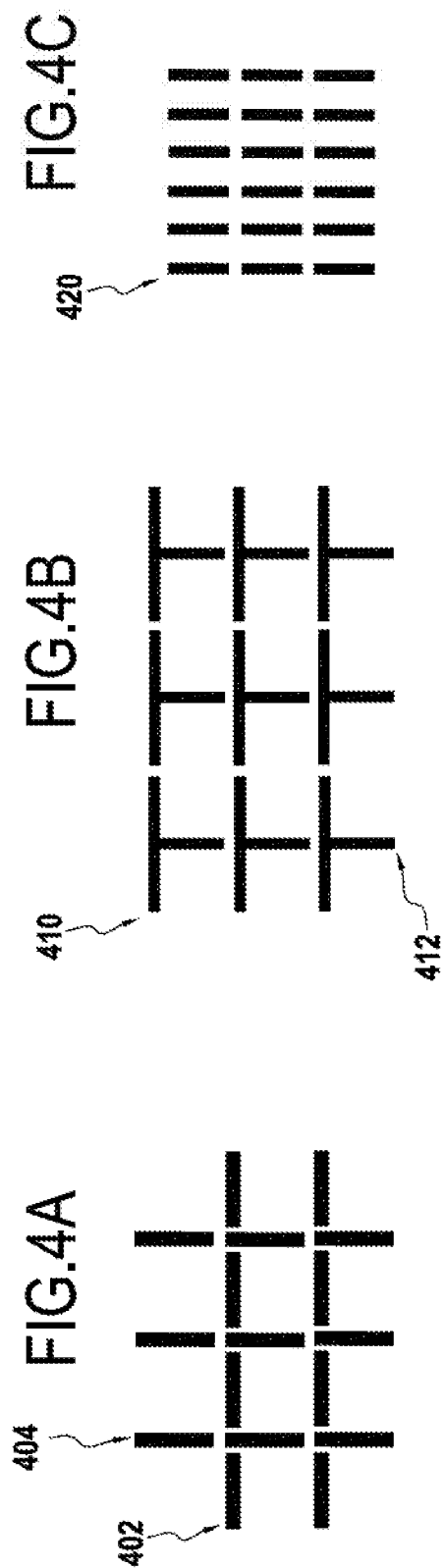
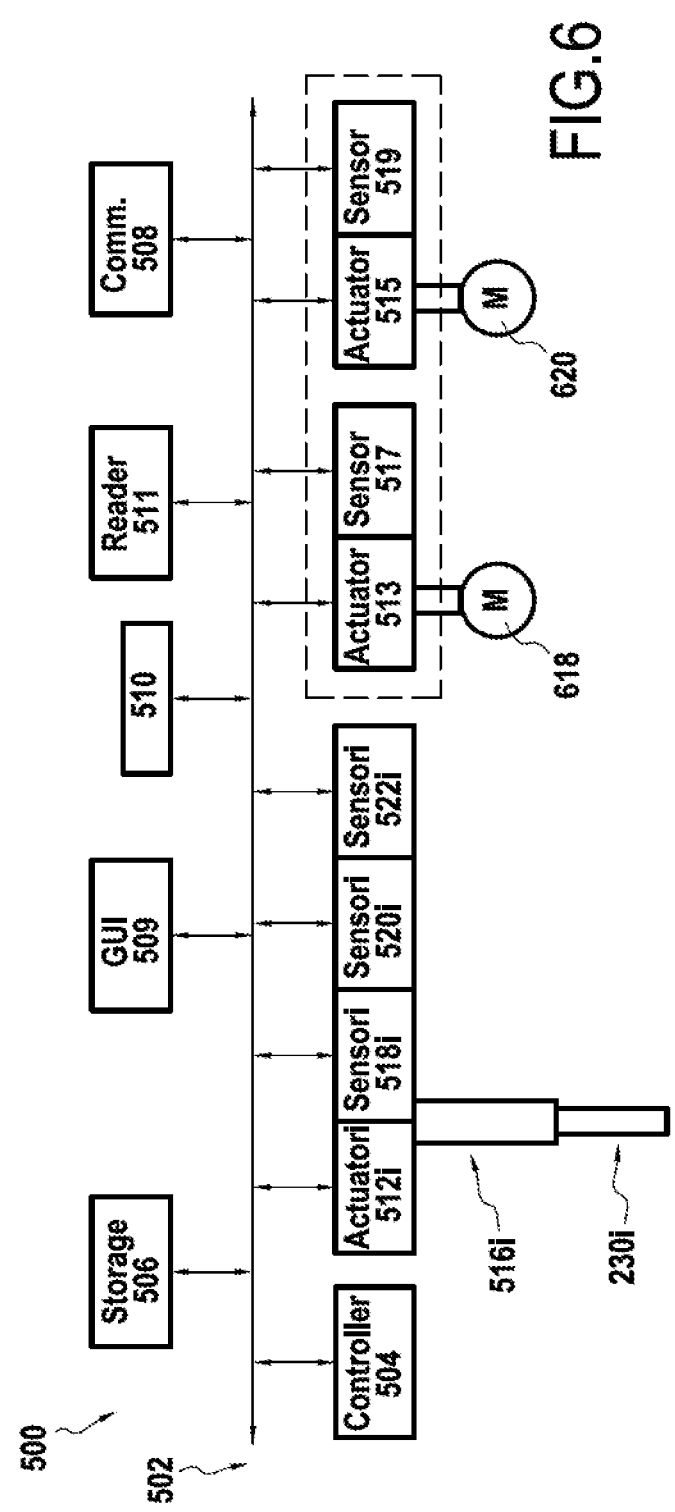

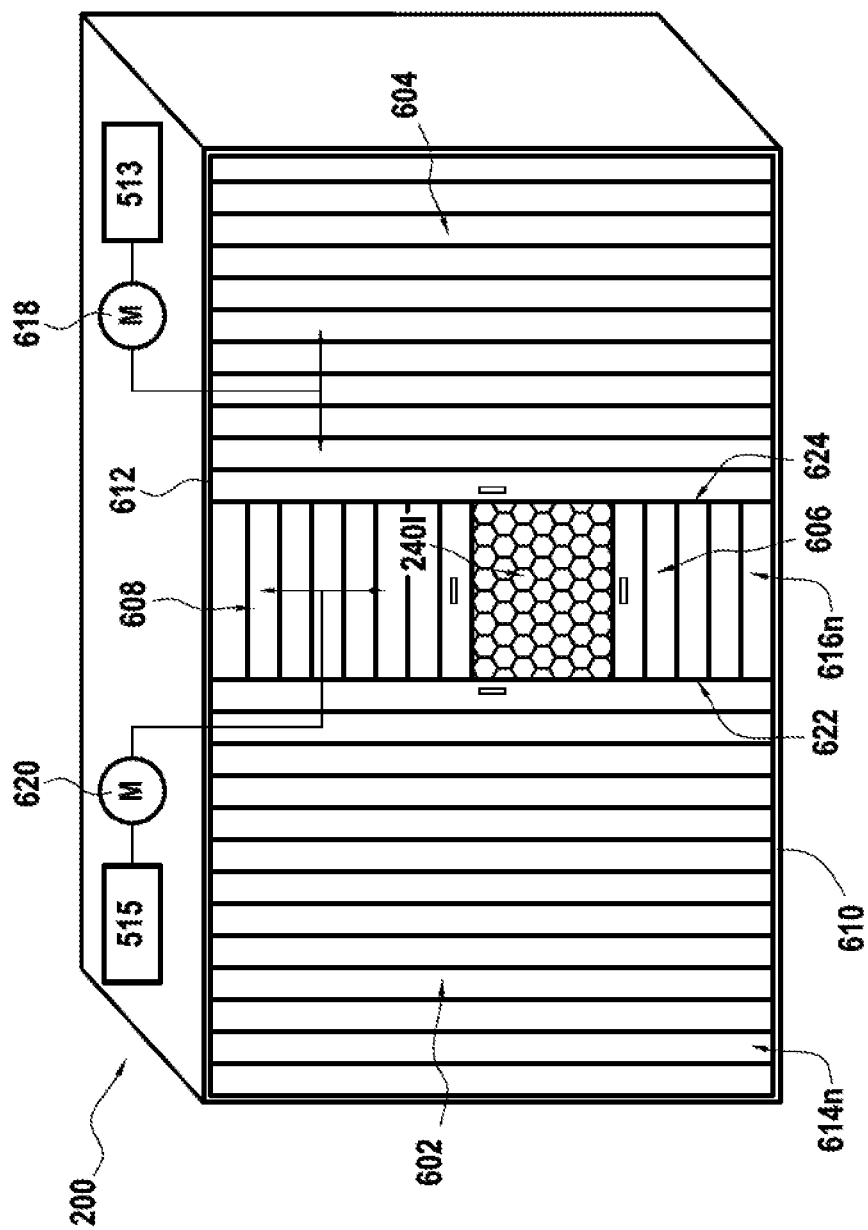

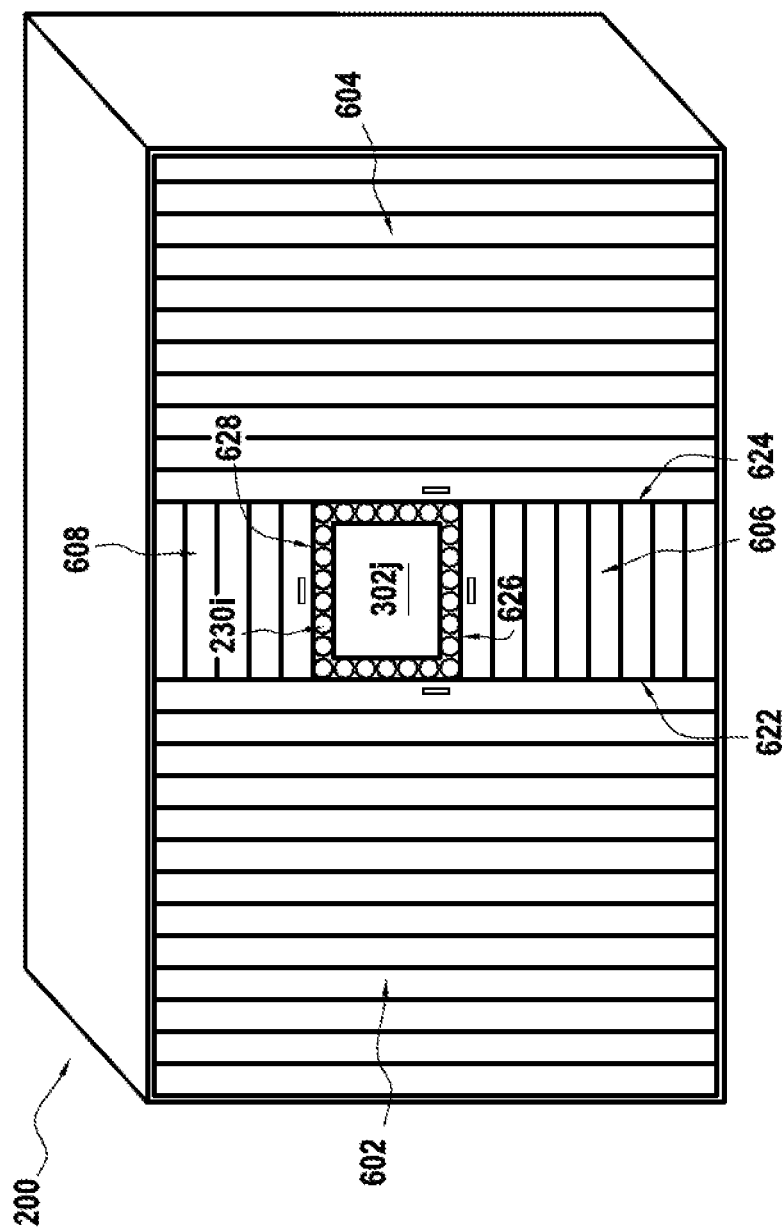

ADAPTIVE PARCEL LOCKER AND RELATED SYSTEMS AND PROCESSES

FIELD OF THE INVENTION

The present application relates to a method and system for depositing shipments by a carrier agent into an electronic parcel locker system and for picking up these shipments thereafter by shipments recipients, and more particularly for optimizing shipment deposit and collection processes related to electronic parcel lockers while allowing an easy pick-up by recipients of their shipments.

BACKGROUND

Electronic parcel locker systems are used for dropping-off, storing and picking-up various kinds of shipment parcels. Such parcel lockers systems are used by carrier agents for dropping parcels, which are then picked-up from the parcel locker by recipients. Typically, a shipping label is attached on each parcel and comprises a unique identification of the parcel. A parcel locker is constituted of different compartments equipped with electronically controlled doors. When dropping-off parcels into a parcel locker, a carrier agent uses one compartment for each parcel to be deposited. A parcel recipient is provided with a code for opening the compartment storing his parcel and picking-up his parcel. In order to handle different sizes of parcels, a parcel locker may comprise different sizes of compartments. Because of industrial and logistics constraints, parcel lockers typically do not include more than three sizes of compartments, and sometimes, by simplicity, include only one standard compartment size. Due to the variability of parcel sizes, the sizes of the compartments cannot match the sizes of the parcels. Besides, when all small compartments are occupied, a small parcel may have to be deposited in a large compartment. A carrier agent may also deposit a small parcel in a large compartment by mistake or ease of use. As a result, the volume of a parcel locker generally is not optimally used and a carrier agent may not be able to deposit all the parcels that he brings for deposit. This lack of volume optimization is a major issue for a parcel locker as the profitability of a parcel locker depends on the number of parcels, which go through the parcel locker. There is a need for increasing the number of parcels, which a parcel locker can handle, per square foot regarding the implantation surface used by the parcel locker and per cubic foot regarding the volume of the parcel locker.

FIG. 1 describes a conventional electronic parcel locker 100, which comprises a series of compartments 102*i* with different sizes (in the illustrated example, three sizes of compartments 102*a*, 102*b*, 102*c*). A carrier agent or a parcel recipient operates the parcel locker via a control panel 104. Parcels 106*i* are deposited in the compartments 102*i*. In the FIG. 1, although two small compartments are empty, parcels 110, 111 and 112 cannot be deposited in the parcel locker because the two empty compartments are too small for the parcels to be deposited. Furthermore, a collection process for a prior art electronic parcel locker is not convenient. A collection by a carrier agent is required when a shipment is not picked up in due time by the receiver. This shipment needs to be collected by the carrier for freeing the compartment for other shipments. Generally, a collection is performed for several parcels, which have not been picked up in due time, and the carrier agent has to successively open, empty and close each compartment with a parcel due to be collected. There is a need for a parcel locker allowing a more efficient collection as well as verifying that all the parcels have been collected.

SUMMARY

Various structures and methods are described herein to at least substantially overcome or ameliorate at least one or more of the above disadvantages. This may be achieved by providing an electronic parcel locker which may be summarized as including: an outside enclosure constituted of two side panels, of a bottom panel, of a top panel and of a back panel fastened together and defining a front aperture of the electronic parcel locker, and an internal structure for supporting parcels deposited in the electronic parcel locker, characterized in that the internal structure is constituted of an array of bars with a same length regularly aligned essentially perpendicularly to the back panel and selectively movable between extended positions where a front end of the array of bars is aligned with the front aperture of the electronic parcel locker, and retractable positions where the bars of said array of bars corresponding to shapes of parcels to be deposited in the electronic parcel locker are retractable towards the back panel for defining temporary compartments exactly adapted to the shapes of parcels.

In a preferred embodiment, the bars of the array of bars are aligned vertically and horizontally so as to optimally match faces of a cuboid parcel, and are touching or almost touching each other's side.

In a particular embodiment, the array of bars is constituted of one of the following structures: bars with a circular section, bars with a T section, bars with a hexagonal section in a honeycomb geometry, flat bars with elongated rectangular sections regularly positioned vertically, rows of flat bars alternatively positioned horizontally and vertically where the flat bars positioned vertically have their top side aligned with top sides of the flat bars positioned horizontally so as to participate in supporting a parcel deposited on the top sides of the flat bars positioned horizontally.

According to a feature, the bars may have a section with a maximum dimension between 2 centimeters and 6 centimeters.

According to another feature, the internal structure may further comprises actuators configured for actively maintaining in the extended positions horizontal and vertical rows of the bars delimiting the temporary compartment for a deposited parcel.

The internal structure may further be constituted of retraction sensors each of which being associated with one bar and wherein the retraction sensors are configured for communicating with a controller for detecting the bars in a retracted position towards the back panel away from the extended position.

Preferably, the retraction sensors are pressure sensors detecting and measuring pressure applied against ends of the bars.

According to a feature, the internal structure may further be constituted of position sensors each of which being associated with one bar and wherein the position sensors are communicatively coupled with a controller for measuring a retraction distance of the associated bar.

According to another feature, the internal structure may further be constituted of weight sensors each of which being associated with one bar and wherein the weight sensors are configured for communicating with a controller for detecting or measuring pressure applied onto the bars when the parcel is deposited onto the one bar.

In another embodiment, the bars are configured for freely sliding towards the back panel under a pressure of a parcel being pushed against the bars.

In a preferred embodiment, actuators are configured for retracting the bars from the extended positions towards the back panel.

According to a feature, it further comprises a closure for the front aperture constituted of four doors organized in two first doors sliding horizontally in a first vertical plane and in two second doors sliding vertically in a second vertical plane wherein the two first doors is positioned immediately near the two second doors.

Advantageously, each of the four doors has a surface at least equal to a surface of the front aperture.

According to a feature, the closure is further constituted of a horizontal bottom sliding guide and of a horizontal top sliding guide defining a horizontal sliding movement of the two first doors and of a vertical left sliding guide and of a vertical right sliding guide defining a vertical sliding movement of the two second doors.

In a particular embodiment, the two first doors are articulated and are constituted of blades with a longitudinal dimension equal to a height of the two first doors and in that the two second doors are articulated and are constituted of blades with a longitudinal dimension equal to a width of the two second doors.

In another embodiment, the closure may further be constituted of motorized axis positioned near each edge of the front aperture and driving a wrapping of each of the four doors.

Preferably, the closure is further constituted of horizontal sliding guide sections prolonging the horizontal bottom sliding guide and the horizontal top sliding guide for directing the two first doors for wrapping around the internal structure and of second sliding guide sections prolonging the vertical left sliding guide and the vertical right sliding guide for directing the two second doors for wrapping around the internal structure wherein sliding sections parallel to and near the back panel among the horizontal sliding guide sections are parallel and wherein sliding sections parallel to and near the back panel among the second sliding guide sections are parallel.

A method for parcel deposit into or parcel removal from an electronic parcel locker constituted of two side panels, of a bottom panel, of a top panel and of a back panel fastened together and defining a front aperture of the electronic parcel locker, and of an array of bars with a same length regularly aligned essentially perpendicularly to said back panel and selectively movable between extended positions and retractable positions, may be summarized as including depositing a parcel by selectively moving from said extended positions, where a front end of the array of bars is aligned with the front aperture, to said retractable positions where the bars of the array of bars corresponding to a shape of the parcel to be deposited in the electronic parcel locker are retracted towards the back panel for defining a temporary compartment exactly adapted to the shape of the parcel.

As a general principle, the active holding of the bars in an extended position by the corresponding actuators ensures that parcel handling with the electronic parcel locker cannot be performed outside authorized procedures.

In a particular embodiment, the method further includes actively maintaining in the extended position rows of the bars delimiting the temporary compartment during a deposit or a removal.

In a preferred embodiment, the method further includes pushing partially out the parcel with the bars set in motion by actuators for guiding removal of the parcel, after a validated removal of the parcel moving the bars in the extended positions, and as long as removal of the parcels is not completed actively maintaining in the extended positions the bars which were in the extended positions previously to initiating removal of the parcel.

In another embodiment, the method further includes retracting the bars according to a length of the parcel for depositing the parcel, and as long as deposit of the parcels is not validated actively maintaining in the extended positions the bars which were in the extended positions previously to initiating deposit of the parcel.

Preferably, the method further includes determining a size of the parcel deposited in front of a group of the bars by calculating a section of the parcel based on the group of the bars detected by retraction sensors and by calculating a length of the parcel based on a retraction distance of the group of the bars measured by position sensors.

BRIEF DESCRIPTION OF THE DRAWINGS

Other aspects, features and advantages of the teachings of the invention will become clearer to those ordinary skilled in the art upon review of the following description in conjunction with the accompanying drawings where:

FIG. 3 illustrates an adaptive parcel locker (APL) with some parcels deposited by sliding them into the parcel locker as the bars facing the back of the parcels are retracted towards the back panel of the parcel locker;

FIG. 4A illustrates a matrix of flat bars regularly positioned vertically and horizontally so as to generate a wire mesh;

FIG. 4B illustrates a matrix of bars in the shape of a T regularly positioned;

FIG. 4C illustrates a matrix of flat bars regularly positioned vertically;

FIG. 5 illustrates an adaptive parcel locker (APL) closure comprising four sliding doors;

FIG. 6 illustrates a control system for an adaptive parcel locker (APL);

FIG. 7 illustrates an adaptive parcel locker (APL) closure in a partially opened position;

DETAILED DESCRIPTION

An objective of the invention is to provide an adaptive parcel locker (APL) capable of handling different sizes of shipping parcels while optimizing the number of parcels, which a parcel locker can handle, per square foot regarding the implantation surface used by the parcel locker and per cubic foot regarding the volume of the parcel locker. An APL automatically adjusts the size of its compartments according to the shape the parcels to be deposited. Such an optimization allows for increasing the number of parcels, which a carrier agent can deposit into the parcel locker.

Figure 2:
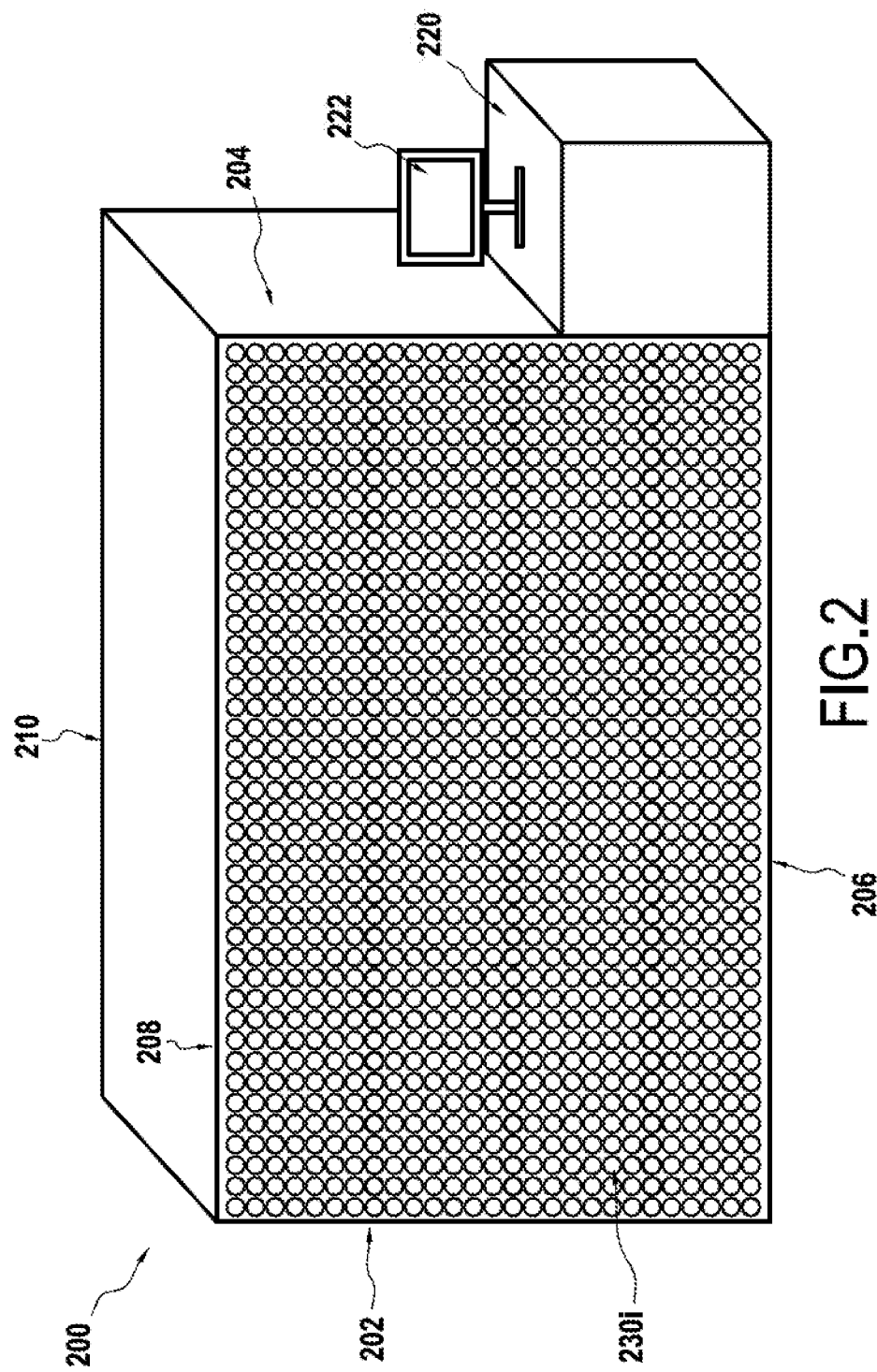
FIG. 2 represents an adaptive parcel locker (APL) according to an embodiment of the invention.

FIG. 2 illustrates such an adaptive parcel locker (APL) 200 according to an embodiment of the invention. The APL comprises an outside enclosure and an internal structure for supporting the parcels to be deposited into the APL. This outside enclosure is constituted of two side panels 202 and 204, of a bottom panel 206 and of a top panel 208, and of a back panel 210. These five panels are fastened together, and provide a structural base for supporting for the internal structure of the APL conceived for holding the parcels deposited into the APL. The APL is controlled by a controller 220, which is provided with a user interface such as a PC screen 222. Preferably, both the controller and the user interface are integrated in the APL structure. The internal structure of the APL is constituted of an array of bars 230$i$, whose length is identical and which are regularly aligned essentially perpendicularly to the back panel 210 within the inside volume of the APL enclosure. Depending on the bars profile, the axes of the bars may be inclined slightly upwards from the back panel in order to ensure a parcel support at least horizontal and eventually with a slope slightly downwards towards the back panel. For bars with a constant section, their axes may be exactly horizontal, but for parcel safety their axis may be inclined slightly upwards from the back panel. For bars with a decreasing section when moving away from the back panel, such as telescopic bars, their axes are preferably inclined slightly upwards from the back panel. Each bar is retractable in a retractable position and can slide towards the back panel 210. When the bars are in their initial positions, i.e. when no parcel is deposited in the APL, the front ends of the bars are all aligned with the front aperture in a plan within the APL volume, and parallel to and near the front side of the APL. These initial positions of the bars correspond to their extended positions.

Figure 1:
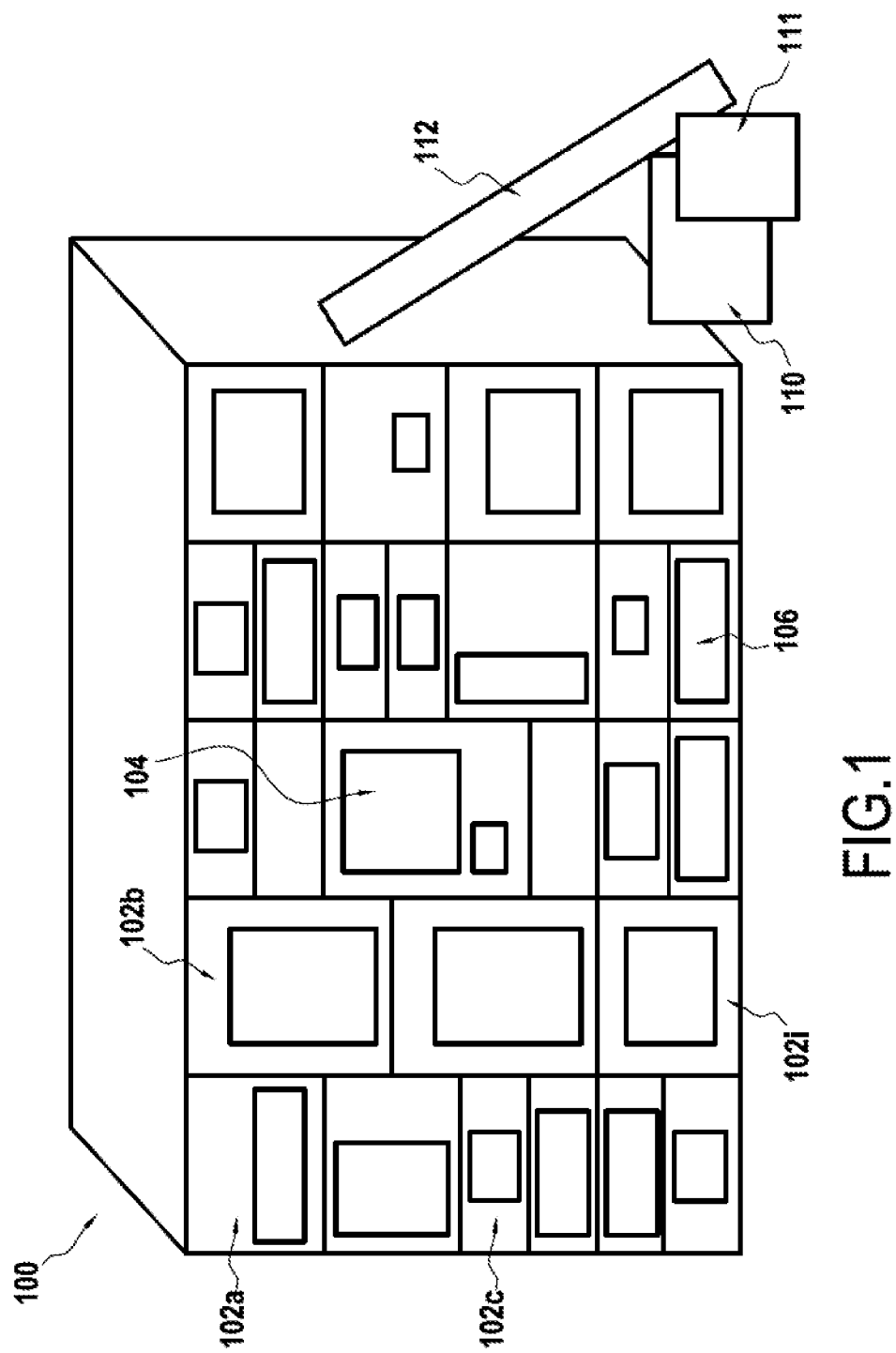
FIG. 1 shows a prior art electronic parcel locker comprising a series of compartments with different sizes.

As illustrated on FIG. 3, a parcel 302$j$ can be deposited in the APL 200 by being sled it into the APL as the bars 230$i$ facing the back of the parcel are retracted towards the back panel 210. Once deposited in the APL, the parcel 302$j$ is supported by a horizontal row of bars below the bottom face of the parcel and is surrounded by two vertical rows of bars on each side of the parcel 302$j$ and a horizontal row of bars above the top face of the parcel. These four rows of bars delimit a temporary compartment exactly adapted to the parcel shape and constitute the four temporary sides of this temporary compartment. For parcels deposited at the bottom of the APL, such as parcel 302$b$, they can advantageously lie on the bottom panel 206. The parcel 302$b$ can then be surrounded by only three rows of bars and can lie directly on the bottom panel 206 or some similar separating support panel. Similarly, for parcels deposited near a side of the APL, such as parcel 302$s$, they can advantageously be positioned directly against that side of the APL or some similar separating panel. The parcel 302$s$ can then be surrounded by only three rows of bars and can lie directly against the left side panel 202. The size of the parcels, which can be deposited in this APL, is only limited by the internal volume of the APL available for parcels. This widely extends the range of admissible parcel sizes, and a parcel 112, which cannot fit into compartments of the prior art parcel lockers as illustrated on FIG. 1, can easily fit into an APL as illustrated on FIG. 3. The design of this APL allows for increasing the number of parcels, which a carrier agent can deposit, and parcels 110, 111 and 112, which cannot fit into a prior art parcel locker as illustrated on FIG. 1, can fit in an APL of similar total height and width as illustrated on FIG. 3. Advantageously, the bars are aligned according to a rectangular matrix, i.e. are aligned vertically and horizontally, so as to optimally match the faces of a parcel, which generally is cuboid. Such a matching minimizes the volume used by parcels deposited in the APL. Preferably, the bars are touching or almost touching each other's side so that the rows of bars delimiting a temporary compartment constitute a barrier preventing a parcel recipient from seeing or accessing any parcel other than his parcel.

In a simpler embodiment, the bar section is circular and can be emptied in the center of the bar. On one hand, the section bars is minimized in order to best match a parcel section with a temporary compartment and to minimize the thickness of the temporary compartments, therefore increasing the number of parcels, which can be deposited in the APL. On the other hand, the section bars needs to remain large enough for supporting the weight of the parcels and for industrial constraints. For example, in an APL with 40 centimeters depth of internal volume, a section with some maximum dimension (i.e. diameter for a circular section) between 2 centimeters and 6 centimeters is preferred. In another embodiment illustrated on FIG. 5, the bar section is hexagonal, corresponding to a honeycomb geometry, which provides a very dense and solid structure. In the particular case of a honeycomb geometry, depending on the directions of the hexagonal sections, either the vertical rows or the horizontal rows of bars 240$i$ delimit a temporary compartment are not exactly rectilinear.

Other bar sections can be used such as those represented on FIGS. 4A, 4B and 4C. A matrix of rows of flat bars alternatively positioned horizontally 402 and vertically 404 so as to generate a wire mesh as viewed from the front of the APL is illustrated on FIG. 4A. Such a wire mesh of flat bars allows for a minimized thickness of the bar rows delimiting a temporary compartment exactly adapted to a parcel shape. Preferably, the vertical flat bars 404 have their top side aligned with the top flat side of the horizontal bars 402 so as to participate in supporting a parcel deposited on the top side of the horizontal bars. FIG. 4B illustrates matrix of bars 410 in the shape of a T. Such a bar geometry is reinforced for supporting a parcel by the vertical flange 412 of the bottom part of the T. A simpler matrix of flat bars 420 with their sections regularly positioned vertically is illustrated on FIG. 4C. Such a simple matrix ensures a structurally solid support for a parcel deposited on the top of the vertical bars. However, the thickness of the horizontal bar rows delimiting the temporary compartment for a parcel is not minimized in this case.

On FIGS. 2 and 3, the APL 200 is represented without any closure, which is however needed for preventing an unauthorized person from removing a parcel from the APL. Typically, such a closure blocks access to the APL until a user is identified by a control system 500, the structure of which is detailed below. The outside enclosure, constituted of the five panels 202, 204, 206, 208 and 210 referenced on FIG. 2, leaves a front aperture, which requires a closure.

FIG. 5 illustrates an APL closure, which ensures that no access to the internal volume of the APL is provided to an unauthorized person. The closure comprises four sliding doors 602, 604, 606 and 608. The two doors 602 and 604 are positioned in the front of the APL and slide horizontally in a same first plane. The height of each of these two doors 602 and 604 is approximately the height of the front aperture. The two doors 606 and 608 are positioned immediately behind the two doors 602 and 604 and slide vertically in a same second plane. The width of each of these two doors 602 and 604 is approximately the width of the front aperture. Alternatively, the positions of the doors can be inverted and the two doors 602 and 604 sliding horizontally can be positioned immediately behind the two doors 606 and 608 sliding vertically. The surface of each of these four doors is at least equal to the surface of the front aperture of the APL. The sliding movement of each door extends from a position where the door does not cover any of the front aperture to a position where the door fully covers the front aperture. A horizontal bottom sliding guide 610 and a horizontal top sliding guide 612 direct the horizontal sliding movement of the two doors 602 and 604 in the front aperture area. The bottom sliding guide 610 is fastened to the bottom panel 206 and the top sliding guide 612 is fastened to the top panel 208, so that these two horizontal sliding guides are in a same vertical plane perpendicular to the bottom panel 206. Preferably, the doors are articulated so as to enable some wrapping of the doors and therefore avoiding the external movement of the doors and minimizing the volume of the APL. Each door 602 or 604 can be constituted of blades 614n, whose length is the height of the door, and which are attached together and articulated along their long edges. Similarly, each door 606 or 608 can be constituted of blades 616n, whose length is the width of the door, and which are attached together and articulated along their long edges. In a preferred closure embodiment, each one of the two horizontal sliding rails 610 and 612 is prolonged to continue directing the sliding of the doors 602 and 604 around the internal volume of the APL. Each sliding rail 610 or 612 is prolonged by a sliding rail section fastened onto the top panel 208 near each side panel 202 or 204 and is prolonged and split into two parallel sliding rail sections fastened in parallel onto the top panel 208 near the back panel 210. As a result, when both doors 602 and 604 are totally opened, they are guided and wrapped around the internal volume of the APL, and are partially overlapping in the back of the APL guided by the parallel sliding rail sections fastened in parallel near the back panel 210. In a particular embodiment, each articulated door is driven by a pulling line such as a motorized belt or chain, on which the door is fastened. The pulling line is driven by two synchronized electrical motors positioned at each end of the line, or the pulling line is circular and driven by a single electrical motor 618. For efficiency purpose, two lines can be used for the same door: a first one attached to the top of the door and a second one attached to the bottom of the door. In another embodiment, a rack and pinion is used, where the rack is developed and fastened along the guiding rail and the pinion is set in motion by an electric motor fastened to the articulated door. For efficiency purpose, each articulated door is driven by two synchronized electrical motors positioned at each end of the door and/or is also driven be symmetric rack and pinion mechanisms installed at the top and the bottom of the door. A similar door system based on guiding rails and a single electrical motor 620 can be applied to the two doors 606 and 608 sliding vertically in the front aperture of the APL so that each of these two doors 606 and 608 can be guided and wrapped around the internal volume of the APL immediately enveloped by the travelling path of the two doors 602 and 604 as it will be understood by those skilled in the art. For this preferred closure embodiment, some side and bottom separating panels are advantageously included between the doors and the array of bars, especially when the surrounding of deposited parcels is limited to three rows of bars when the parcels sit next to a side or the bottom of the APL. In a second closure embodiment, rather than wrapping around the internal volume of the APL, each articulated door wraps around a motorized axis positioned either near the left edge of the front aperture for the door 602 or near the right edge of the front aperture for the door 604 or near the bottom edge of the front aperture for the door 606 or near the top edge of the front aperture for the door 608. This second closure embodiment provides a less compact solution than the preferred closure embodiment. However, the implementation of this second embodiment is easier, and may be chosen for industrial considerations. A combination of the preferred closure embodiment and of this second closure embodiment can also be implemented.

In one embodiment of the invention, the APL is in a partially automatized mode. When a carrier agent deposits a parcel, he needs to push the parcel against the bars into the APL inside volume. The bars do not retract automatically, but they can be freely pushed by the carrier agent. However, the adaptive parcel can implement multiple automatized mechanisms for easing and securing user operation of the APL.

FIG. 6 illustrates the control system 500 for an APL. The control system includes a bus 502, which connects major components of the control system, such as a controller 504, one or more memory storage components 506 such as RAM, ROM, flash RAM, hard drive, flash drive, or the like and a communication interface 508 for long distance communication such as an Ethernet, Internet, wide area network, or similar connection for communicating for example with a remote server system storing shipment information related to parcels such as parcel identifications or parcel dimensions or recipient information. Additional components can also be connected to bus 502 as part of the APL user communication interface, such as a graphical user interface 509 for example a touchscreen, with eventually a keyboard or such as loud speakers or microphones or cameras 510, or such as a reader 511 for reading shipping labels or user identifications. In a simpler architectural embodiment, the controller 504 corresponds to a single processor unit and can be implemented in a separate box as illustrated for controller 220 on FIG. 2. However, more generally, several different processors may interact in the controlling of an APL operation. The memory storage 506 comprises a main memory into which an operating system and application programs and software modules are loaded such as algorithms for optimizing the control of actuators 512i of the bars or actuators 513, 515 of the two doors of the APL. The memory storage 506 can contain, among other codes, software which controls basic hardware operation of the system, such as interactions with peripheral components and for example for controlling actuators 512i, 513 or 515 of the APL. The memory storage 506 also contains data for operating the APL such as carrier agent authorization codes required from carrier agents for accessing the APL or recipient authorization codes required from recipients for accessing the APL or time-limit rules for determining when a collection is required for each parcel stored in the APL. Some of the application programs or software modules or some of the data referred to above as stored in the memory storage 506, can be stored in the remote server system, and eventually run in SaaS mode (Software as a Service). In that case, required data for operating the APL are communicated via the communication interface 508, eventually in an as needed manner. The bus 502 allows data communication between the controller 504 and the different components connected to the bus, and in particular with actuators 512i. Each actuator 512i causes a horizontal movement or an actively holding of a position of a corresponding bar 230i under the control of the processor 504. In a particular embodiment of the invention, each bar 230*i* slides into a guiding element 516*i*. An exemplary embodiment is a usage of hydraulic pistons equipped with solenoid valves or of telescopic cylinders, which minimize the required depth of the APL. In order to minimize the impact of potential leaks, a gas fluid can be chosen, preferably with minimum impact on the environment such as air or some inert gas. For designs requiring a higher pressure, liquids are preferred. Another exemplary embodiment is a usage of motorized axe set in motion via a rack and pinion or via a worm drive. In a simpler embodiment, the actuator is based on a spring, which action is to bring back the associated bar in its extended position, and which can be compressed when a parcel is pushed against the associated bar. Preferably, the control system also comprises for each bar 230*i* a sensor, which can be a retraction sensor 518*i*, a position sensor 520*i* or a weight sensor 522*i*. Each of these sensors communicates with the controller 504 and allows for the monitoring of the corresponding bar. These sensors provide information regarding the position, the size and the weight of a deposited parcel, and therefore can establish the presence of a parcel in the APL for inventory purpose or tracking purpose. In a preferred implementation, the retraction sensor 518*i* is a pressure sensor, which can detect and measure any pressure onto the corresponding bar 230*i*. This sensor can in particular detect and measure pressure applied against the end part of the corresponding bar, and therefore detect when a parcel is pushed into the internal volume of the APL against the end of the bar during the deposit of that parcel. The combined information, received from the retraction sensors corresponding to bars in contact with the back of the parcel, allows the control system to approximatively determine the section of the parcel by running a shape detection software module. By measuring the retraction distance of the bars with a position sensor 520*i* such as a reflective optical sensors or an encoder mounted on the motor of a motorized bar, the length of the parcel can be determined by the controller 504, and therefore the size of the parcel can be established. Weight sensors 522*i* are preferably pressure sensors and can detect and measure pressure applied on the top side of each bar, and therefore detect a parcel deposited in the APL or measure its weight. Advantageously, retraction sensors and weight sensors are the same pressure sensors performing both the functions of detecting pressure against the end parts of bars and measuring pressure applied onto bars. Sensors specifically detecting the position of parcels can also be used instead of pressure sensors or in combination with pressure sensors. Algorithms for determining the weight or the position or the size of a deposited parcel, based on the data provided by the sensors 518*i* or 520*i* or 522*i*, are comprised in software programs, which are stored in the storage 506 and run by the controller 504 according to processes well known by those ordinary skilled in the art of the operation of a computer device. Similarly the control system also comprises for each door a sensor 517 or 519 which preferably can be a position sensor. Each of these sensors communicates with the controller 504 and allows for the monitoring of the corresponding door and provides information regarding the position of each door, and therefore can establish the presence of an agent or a recipient in front of a temporary compartment of the APL for tracking purpose.

For easing and securing user operation of an APL, the control system can enforce the following rules and behaviors based on information provided by the sensors 518*i* or 520*i* or 522*i* and processed by the controller 504. For a new deposit of parcels, the bars, which constitute the rows delimiting a temporary compartment of an already deposited parcel, are actively held in their extended position by the actuators 512*i*. This holding ensures that a row of bars, constituting a compartment separation, is maintained between a new parcel being deposited and any parcel previously deposited. If a thicker separation is deemed necessary, the control system can enforce the holding in their extended position of more than one row of bars. The bar rows delimiting a temporary compartment of an already deposited parcel, and actively held in their extended position, are also a barrier during a parcel pick-up preventing the parcel recipient from accessing any parcel other than his parcel. In the particular case when the section of a parcel inserted into the APL is not of rectangular shape, the control system can determine the particular shape of the parcel by running the shape detection software module and can define a rectangle circumscribed to the particular shape and delimited by horizontal bar rows and vertical bar rows. In that case, all the bars around the particular shape parcel and within the circumscribed rectangle are actively held in their extended position by the actuators 512*i*. As a general principle, the active holding of bars 230*i* in an extended position by the corresponding actuators 512*i* ensures that parcel handling with the APL cannot be performed outside authorized procedures.

The effectiveness of the deposit of parcels by a carrier can be further improved by controlling the bar positioning based on the information provided by the sensors 518*i* or 520*i* or 522*i* and processed by the controller 504. If the carrier agent randomly deposits parcels in the APLs, generally some areas in between the parcels remain unable to be filled with parcels, therefore not maximizing the number of parcels deposited in the APL. For example, for an initial deposit, the APL is preferably filled-up with parcels beginning from a bottom corner of the APL. Such a situation can occur after a collection, which completely empties the APL of all parcels. FIG. 3 illustrates a filling-up with parcels beginning with the left bottom corner of an APL. The parcel deposit process can be guided by the control system according to deposit algorithms and rules run by the controller 504. Based on data provided by the sensors 518*i* or 520*i* or 522*i*, the control system can continuously determine areas in the APL, which are appropriate for a next deposit, and forbidden areas, which should be excluded for a next deposit. When a carrier agent tries to deposit a parcel in a forbidden area, the bars facing the parcel undergo some pressure from the parcel being inserted in the APL, and this pressure is detected by the corresponding sensors 518*i*. If the bars under pressure from the parcel are in a forbidden area, then they are actively held in position by the controller 504, eventually following on a limited retraction, indicating to the carrier agent that the area is forbidden and therefore forcing him to use an appropriate area.

Instead of the bar position holding or in combination with the bar position holding, the carrier agent can be alerted and guided by other user communication interface such as voice messages from the speaker 510 or messages on the graphical user interface 509. As an additional help for the carrier agent, the control system can indicate a place by partially retracting some bars delimiting a rectangular section where to deposit the parcel. The dimensions of the rectangular section is determined by the control system and correspond to the bars, which previously underwent some pressure from the parcel surface. When a parcel collection is required, the carrier agent actions can also be guided and monitored by the control system. The controller 504 commands the actuators 512*i* of the bars behind the parcels to be collected to push these parcels partially out. The carrier agent then can visualize all the parcels to be collected and remove them efficiently. The weight of a deposited parcel can be continuously monitored by the sensors 522$i$ of the bars below the parcel. Following on a parcel removal, the nullification of the measured weight by the sensors 522$i$ validates the collection of the parcel by the carrier agent, and the corresponding bars are fully extended by the actuators 512$i$ under the control of the controller 504. The rules and behaviors described above are exemplary of the use of the control system 500, but it will be understood by those skilled in the art that the invention also applies to a variety of additional rules and behaviors.

Additional components may be included in the control system 500 as will be understood by a person skilled in the art; conversely, all of the components shown in FIG. 6 need not be present to practice the invention. The components can be interconnected in different ways from that shown. The operation of a computer such as that shown in FIG. 6 is readily known in the art and is not discussed in detail in this application. The above description primarily focused on operating a single APL, but it will be understood by those skilled in the art that the invention also applies to several APLs operating in a network. In particular, if several APLs are installed within the same perimeter, these APLs can be managed as only one APL with combined communication to a remote server system, and a carrier agent can operate them as a group.

As a general rule, total access to the internal volume of the APL is provided to a carrier agent (closure totally opened) and partial access to a specific volume of the APL, where a recipient parcel is stored, is provided to the parcel recipient (closure partially opened).

The above closure embodiments allow the APL to achieve the positions partially opened, totally closed or totally opened. A partial access for a recipient to a specific parcel volume of the APL, where the recipient parcel is stored, is provided when the closure is in partially opened position, which is achieved as illustrated FIG. 7 by sliding the visible edge 622 of the left door 602 on the left side of the specific parcel volume, by sliding the visible edge 624 of the right door 604 on the right side of the specific parcel volume, by sliding the visible edge 626 of the bottom door 606 on the bottom side of the specific parcel volume and by sliding the visible edge 628 of the top door 608 on the top side of the specific parcel volume. Once a recipient has removed his parcel from the APL, the closure moves to a totally closed position. This totally closed position is achieved by sliding the edges 626 and 628 of the doors 606 and 608 towards each other, and at the same time sliding the edges 622 and 624 of the doors 602 and 604 towards each other. The sliding at the same time of the four doors allows minimizing the closing time. However, successive sliding of the doors or limiting the sliding to one of the doors 606 or 608 and one of the doors 602 or 604 is also possible. The superposition of the two sets of two doors provides a double layer for the closure, therefore increasing the closure security against unauthorized penetration attempt into the APL. Preferably, the security against an unauthorized parcel deposit is enhanced by having the control system command the actuators 512$i$ to actively maintain in an extended position all the bars 230$i$, which do not face any parcel previously deposited. This security measure is released only when an authorized carrier agent initiates a deposit process and the bars are then freed to slide if pushed towards the back panel 210. When a new recipient accesses the APL to pick-up his parcel, the 4 doors slide for positioning their respective edges 622, 624, 626 and 628 in front of the specific parcel volume of the recipient parcel. This door positioning is performed by sliding each couple of doors 602-604 and 606-608 at exactly the same speed so that their edges remain contiguous two by two (622-624 and 626-628) during their travel, therefore ensuring that the closure remains totally closed and preferably locked (for example with an electric or magnetic lock). The travelling of the two couple of doors at the same time allows minimizing the positioning time. However, successive traveling of the couples of doors is also possible, and maintaining contiguous the edges of the couple of doors internal to the APL, although preferable, may not be implemented as long as the edges of the couple of doors external to the APL are maintained contiguous. Once the door edges are positioned in front of the specific parcel volume of the recipient parcel, the doors can slide so that the closure takes the partially opened position providing access to the specific parcel volume for the recipient to retrieve his parcel. When a carrier agent initiates a deposit process or a collection process, the closure must move to a totally opened position. This totally opened position is achieved by sliding the four doors totally opened, which corresponds to the door edge 622 positioned near the left edge of the front aperture, the door edge 624 positioned near the right edge of the front aperture, the door edge 626 positioned near the bottom edge of the front aperture, and the door edge 628 positioned near the top edge of the front aperture. Following on the completion of a deposit as well as following on the completion of a pick-up, the closure moves to a totally closed position. Preferably, the doors then move to a central position, which corresponds to having the door edges 622, 624, 626 and 628 positioned in the center of the APL front aperture. Moving to that central is an optimization for minimizing the time for providing access to the deposited parcel for the next recipient. A further optimization is to move the closure to a central position in reference with the different positions of the parcels deposited in the APL rather than the central position in reference to the APL front aperture.

In some cases, an APL needs to be shared between different carriers. The APL can then be split into rectangular zones, each dedicated to a particular carrier. When a carrier agent of a particular carrier initiates a deposit process or a collection process, instead of moving to a totally opened position, the closure moves to a carrier zone position associated with that particular carrier. The carrier zone position for the closure is equivalent to an extended partially opened position, where the edges of the doors are positioned on the sides of the rectangular zone allocated to the particular carrier rather than positioned on the sides of a specific parcel volume associated with a deposited parcel. The bars 230$i$ delimiting a carrier zone are permanently held extended by the corresponding actuators 512$i$ until the carrier zone is redefined. Data defining the carrier zones are accessible from the storage 506 by the controller 504, which can use them for controlling the actuators and the doors movement.

In order to prevent the doors from closing on a user or on a sticking out parcel, a sensor system verifies that no object is in the closure way for the doors to securely close. The doors movement is blocked as long as an object is in the closure way, and preferably the user can be alerted and guided by some user communication interface such as voice messages from the speaker 510 or messages on the graphical user interface 509. In a preferred embodiment, the sensor system is a laser system, whose laser beams crisscross the APL front aperture, and consisting for example in linear arrays of solid state laser diodes emitting towards linear arrays of solid state laser detectors.

In another embodiment of the invention, the APL is in a fully automatized mode. When a carrier agent initiates a parcel deposit, the APL indicates to the agent where to deposit the next parcel in the APL by automatically retracting the corresponding bars. Based on the dimensions of the parcel, the controller 504 identifies an optimized location in the APL and selects the bars corresponding to this optimized location. Then, the controller commands the corresponding actuators to retract in retractable positions according to the length of the parcel and the carrier agent can deposit the parcel in this newly created temporary compartment. The parcel dimensions can be provided to the APL according to different processes including reading the parcel dimensions on a shipping label attached onto the parcel with a reader 511 installed in the APL such as an optical barcode reader or receiving the parcel dimensions from a remote server system based on an identification of the parcel or requesting the carrier agent to enter the parcel dimensions on the graphical user interface 509. The use of a reader 511 able to read information from all the parcels brought for deposit by a carrier agent, such as a RFID area system reading as a group RFID tags of all the parcels as described in application EP17305016, allows for further automation of the APL including consolidation of parcels sent to the same recipient in a same temporary compartment and concentrating parcels in an optimized zoning as described in application EP17305016. Parcel consolidation and migration is particularly appropriate in the case of an APL as a temporary compartment can be expended as required in an APL, as opposed to a prior art parcel locker with physical non adaptable compartments. In order for further easing and securing user operation, an APL can also be controlled by user mobile devices as described in application EP16306329. The operation of an APL can be further optimized by integrating machine learning capabilities, preferably run in a remote server system, whose results are provided for optimally operating the APL. Such machine learning capabilities process historical statistics relative to all the APLs communicating with the remote server system and stored in the remote server system such for example dimensions of parcels, which have been deposited in the APLs, for the controller 504 to identify an optimized location in the APL where to deposit the next parcel. Machine learning capabilities also allow for adapting deposit methods and their associated constraints for example by processing historical statistics relative to the filling rate of APLs. If an APL shows a relatively low filling rate, rather than having the control system of the APL guiding the carrier agent for depositing its parcels and forcing him to fit each parcel in a proposed optimized location, the control system can alert the carrier agent that he can deposit the parcels as he prefers in order to expedite his deposit.

Figure 8:
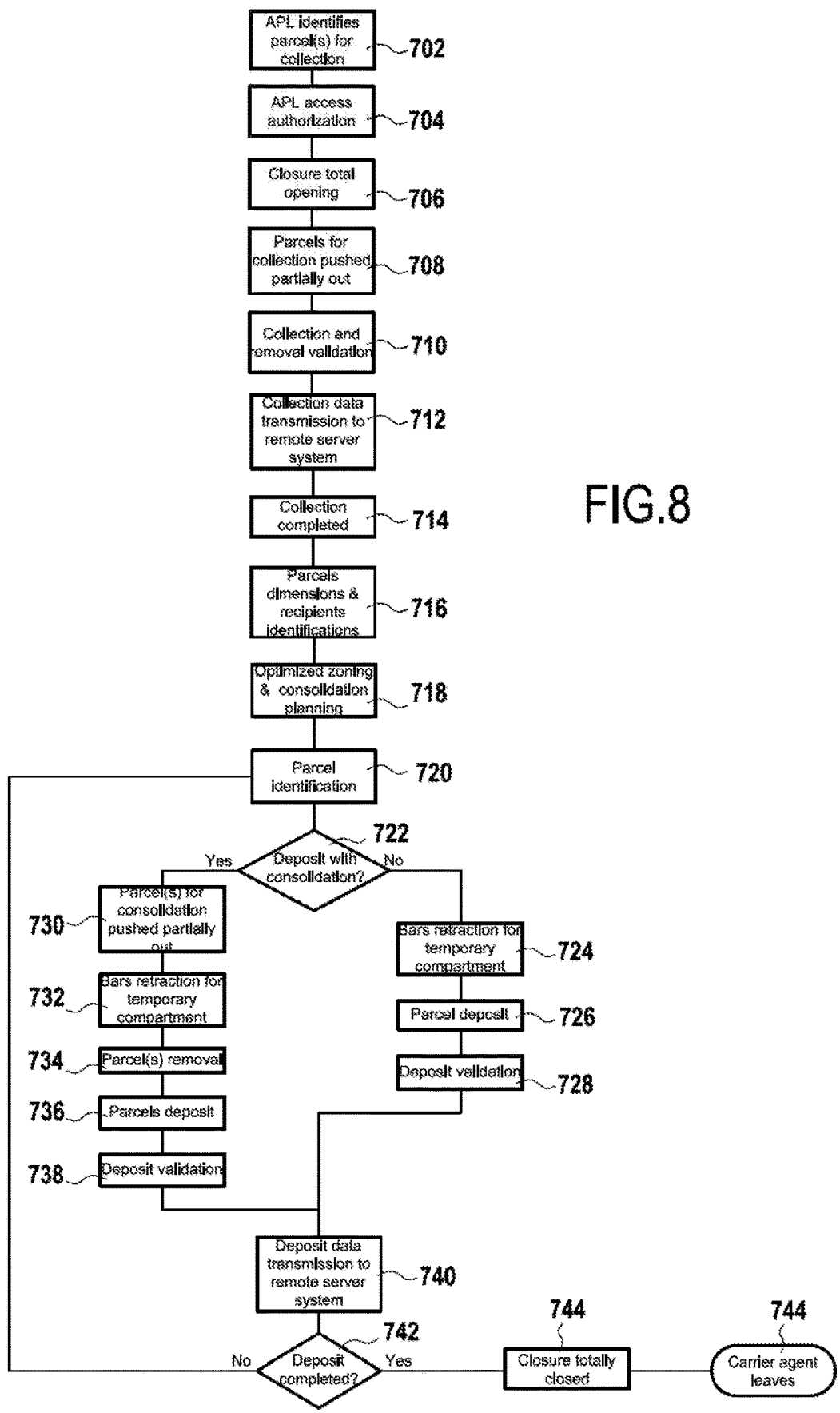
FIG. 8 illustrates a process for collecting and depositing parcels by a carrier agent with an adaptive parcel locker (APL) according to the invention.

FIG. 8 illustrates how parcels are deposited and collected by a carrier agent according to the invention. When a group of parcels is planned to be deposited in a particular APL 200, the deposit task is assigned to a carrier agent. The carrier agent may also have to perform a collection if parcels have not been picked up in due time from the APL by receivers. Typically, a collection is performed before a deposit so as to free space in the APL for the deposit. Generally, data required for updating the APL are transmitted on a regular basis from the remote server system to the APL such as time limits rules for pick-up by recipients or carrier agent authorization codes or recipient identification for performing parcels consolidations in the APL or eventually dimensions of parcels due to be deposited. Based on the time-limit rules, the APL determines when a parcel is due to be collected (act 702). Alternatively, this determination can also be performed by the remote server system and communicated to the APL via the communication interface 508. In act 704, the APL performs an authorization procedure for allowing access to the APL by checking an authorization code provided by the carrier agent. The authorization code can be provided in a multiplicity of manners including by reading a barcode with a reader 511 or by using a mobile device of the carrier agent as described in application EP16306329 or by using RFID technology as described in application EP17305016. Once access to the APL is authorized, the APL closure, which was in a totally closed position, moves to a totally opened position (act 706).

If one parcel or a group of parcels is due to be collected and corresponds to a carrier organization for which the carrier agent works, the APL guides the carrier agent for the collection by having the actuators 512i of the bars behind the parcels to be collected push these parcels partially out (act 708). The carrier agent can visualize all the parcels to be collected and then removes them efficiently. Following on a parcel removal, the nullification of the measured weight by the sensors 522i validates the removal of the parcel by the carrier agent. Once the parcel removal is validated, the bars corresponding to the removed parcel are fully extended by the actuators 512i (act 710). The APL logs and updates information data relative to the parcel collection. Eventually, the APL transmits to the remote server system data regarding the parcels collection and preferably any operation information of the APL 200 (act 712). Advantageously, along the whole collection process, the user communication interface, such as the graphical user interface 509 or the loud speakers 510, are used for informing and guiding the carrier agent for operating the APL, for example for informing that there is a parcel to be collected or that the collection is completed. In act 714, the APL controller 504 validates that there are no more parcels for collection by the carrier agent (no more parcel weight is measured by the corresponding sensors 522i). As long as the collection is not completed, all the bars other than the ones facing the remaining parcels, which have not been collected from the APL, are actively held in extended position by the corresponding actuators 512i so that the carrier agent cannot deposit any parcel before all parcels for collection are collected. Alternatively, the carrier agent may decide to stop the parcels collection. The carrier agent informs the APL that he wants to stop the collection process. The APL alerts the carrier agent that he must push back into the APL the remaining parcels, which he has not collected. As long as the sensors 518i or 520i facing the remaining parcels, which have not been collected, have not detected that these parcels have been pushed back into the APL, all the bars other than the ones facing the remaining parcels, which have not been collected, are maintained actively held in extended position, and if the carrier agent tries to deposit a parcel, the sensors 518i of the APL detect the pressure applied against the end parts of the corresponding bars 230i facing the parcel, and the APL alerts the carrier agent that he still must push back into the APL all the remaining parcels, which he has not collected.

Once the collection is completed or all the non-collected parcels have been pushed back into the APL, the APL can initiate the deposit. In a preferred embodiment, dimensions of the parcels for deposit and associated recipient identifications are provided to the APL for all the parcels to be deposited, for example by using a RFID reader able to read as a group RFID tags of all the parcels brought for deposit by a carrier agent as described in application EP17305016 or by receiving them from a mobile device of the carrier agent as described in application EP16306329 (act 716). Based on the dimensions of the parcels for deposit and the associated recipient identifications, the APL establishes an optimized zoning for the carrier agent deposit and plans for parcel consolidations. Based on the recipient identifications, the control unit defines the parcels consolidations, which have to take place, identifies in which areas of the APL these consolidations can take place, and plans for parcel consolidations and deposits. In order to minimize the carrier agent travel for the deposit, the areas involved in the deposit are concentrated in a spatially minimized zone of the APL (act 718). In act 720, when the carrier agent takes a parcel for depositing it in the APL, an identification of the parcel is transmitted to the APL. This parcel identification, depending on the invention embodiment, can be printed on a shipping label of the parcel in the form of a barcode and captured by a barcode reader 511 or can be comprised in a RFID tag affixed onto the parcel and read by a RFID reader connected with the APL or can be captured by a mobile device of the carrier agent and transmitted from the mobile device to the APL as described in application EP16306329. In a fully automatized mode, based on the parcel deposit/collection plan established by the APL, the controller 504 prepares a new temporary compartment in case of simple deposit, and in case of a consolidation indicates in addition which parcel already deposited needs to be consolidated (act 722).

When no consolidation is required with the parcel that the carrier agent wants to deposit, the APL indicates to the carrier agent where to deposit the parcel in the APL by automatically retracting the corresponding bars. Based on the dimensions of the parcel and on the optimized zoning and on the parcel deposit/collection plan, the controller 504 identifies an optimized location in the APL and selects the bars corresponding to this optimized location. Then, the controller commands the corresponding actuators to retract in retractable positions according to the length of the parcel. The APL automatically adjusts the size of the temporary compartment according to the shape of the parcel to be deposited. Preferably, the bar rows delimiting the temporary compartment are actively held in their extended position and serve as a guide for the carrier agent for the parcel deposit (act 724). The carrier agent sees the newly created temporary compartment and deposits the parcel by sliding it into the temporary compartment and pushing it against the retracted bars in the back of the temporary compartment (act 726). The controller 504 validates the deposit and preferably verifies the section and the weight of the parcel. The sensors 518*i* corresponding to the bars in contact with the back of the parcel, allow the control system to determine the section of the parcel. The sensors 522*i* corresponding to bars under the parcel detect and measure the weight of the parcel deposited on top of them. In a simpler embodiment, these sensors simply detect and establish the presence of a parcel in the temporary compartment. If the deposit is not validated by the controller, user communication interface of the APL, such as the graphical user interface 509 or the loud speakers 510, alert the carrier agent regarding the invalid situation and guide the carrier agent for resolving the invalid situation. The bars of the temporary compartment remain retracted waiting for the deposit of the expected parcel and all other bars, which are not retracted behind a parcel, remain actively held in their extended position by the actuators 512*i* until the situation is resolved. Once the deposit is validated by the controller 504, preferably the APL informs the carrier agent regarding the valid situation via the user communication interface (act 728).

Consolidation

When a consolidation is required with the parcel that the carrier agent wants to deposit, the controller guides the carrier agent for removing from the APL the parcel or parcels, which needs to be consolidated, by having the actuators 512*i* of the bars, behind this parcel or these parcels to be consolidated, push the parcel(s) partially out. Generally, the parcel already deposited and to be consolidated is unique. But several parcels may already be grouped for the same recipient following on a previous consolidation or because of a previous grouped deposit. Preferably, the bar rows delimiting the temporary compartment are actively held in their extended position and serve as a guide for the carrier agent for the parcel deposit (act 730). In parallel, the APL indicates to the carrier agent an optimized location where to deposit both, the new parcel to be deposited in the APL and the parcel(s) already deposited and to be consolidated, by automatically retracting the corresponding bars of this optimized location. This is achieved as follows. Based on the dimensions of the parcel and on the optimized zoning and on the parcel deposit/collection plan, the controller 504 identifies an optimized location in the APL and selects the bars corresponding to this optimized location. Then, the controller commands the corresponding actuators to retract the bars of the optimized location in retractable positions according to the length of the grouped parcels to be consolidated (act 732). The carrier agent can visualize the parcel(s) to be consolidated, which has(ve) been partially pushed out, and can remove it or them from the APL. Following on the parcel removal, the nullification of the measured weight by the sensors 522*i* validates the removal by the carrier agent. Once the parcel removal is validated, the bars corresponding to the removed parcel(s) are fully extended by the actuators 512*i* (act 734). The carrier agent, seeing the newly created temporary compartment, deposits the parcels to be consolidated by sliding them into the temporary compartment and pushing them against the retracted bars in the back of the temporary compartment. Preferably, the user communication interface, such as the graphical user interface 509 or the loud speakers 510 guide the carrier agent on how to group the consolidated parcels for fitting them into the temporary compartment (act 736). The controller 504 validates the deposit and preferably verifies the weight of the parcels and can verify the section of the parcels. The sensor 522*i* corresponding to bars under the parcels detect and measure the weight of the parcels deposited on top of them. The sensors 518*i* corresponding to bars in contact with the back of the parcels, allows the control system to determine the combined section of the parcels. In a simpler embodiment, these sensors simply detect and establish the presence of a parcels in the temporary compartment. If the deposit is not validated by the controller, user communication interface of the APL, such as the graphical user interface 509 or the loud speakers 510, alert the carrier agent regarding the invalid situation and guide the carrier agent for resolving the invalid situation. The bars of the temporary compartment remain retracted waiting for the deposit of the consolidated parcels and all other bars, which are not retracted behind a parcel, remain actively held in their extended position by the actuators 512*i* until the situation is resolved. Once the deposit of the consolidated parcels is validated by the controller 504, preferably the APL informs the carrier agent regarding the valid situation via the user communication interface (act 738).

The APL logs and updates information data relative to the parcels deposit and consolidation. Eventually, the APL transmits to the remote server system data regarding the parcels deposit and consolidation and preferably any operation information of the APL (act 740). Each time the carrier agent takes a new parcel for depositing it in the APL, the deposit process resumes from act 720 (act 742). Once all deposits are performed or if the APL is filled before the end of deposit, the APL informs the carrier agent regarding of the end of the deposit process via the user communication interface. The closure moves to a totally closed position. Preferably, the doors move to a central position in order to minimize the time for providing access to a deposited parcel for a recipient to come. Alternatively, in a further optimization, the doors move to a central position in reference with the different positions of the parcels deposited in the APL (act 744). A recipient authorization code is generated for each deposited parcel. The recipient authorization code is used afterwards by the recipient for picking-up his parcel in the APL. The recipient authorization code can be generated by the APL or by the remote server system or by the mobile device of the carrier agent. Preferably, the recipient authorization code is generated immediately after the validation of the deposit of the corresponding parcel because the recipient needs to be informed of the deposit as soon as possible and needs this recipient authorization code for picking-up his parcel. But, the recipient authorization code can also be generated previously and associated with the deposited parcel. Preferably, along the whole consolidation and deposit process, the user communication interface, such as the graphical user interface 509 or the loud speakers 510, are used for informing and guiding the carrier agent for operating the APL, for example for informing the carrier agent that there is a parcel to be consolidated. Advantageously, during the collection and deposit processes, if at some point the order chosen by the carrier agent for depositing parcels compromises the parcel deposit/collection plan established by the controller, the APL user communication interface alert the carrier agent that he should take another parcel for deposit and eventually advise him on which parcel to deposit next.

It is easily devised by those ordinary skilled in the art that the order of the collection process and deposit process can be exchanged, or that the carrier agent may start by depositing parcels, then switch for collecting parcels because the APL is full or following on a request from the APL, before resuming the deposit. Preferably, the user communication interface provide guidance to the carrier agent when he needs collecting parcels or inform the carrier agent that he can initiate the parcel collection at his convenience. When a carrier agent initiates the deposit process before the collection process, the optimized zoning established by the APL also takes into account the parcels due to be collected from the APL by the carrier agent.

In an embodiment of the invention, where the APL is in a partially automatized mode, the bars do not retract automatically, but can be freely pushed by a carrier agent for depositing a parcel into the APL inside volume. In such a partially automatized mode, the APL cannot guide the carrier agent for deposit by retracting the bars of the APL inside volume. Other guiding means could be used, such as a graphical user interface 509 or loud speakers or microphones or cameras 510. However, the carrier agent is free to initiate sliding a parcel against any extended bar other than the bars already constituting a temporary compartment separation. In order to optimize the loading of the APL, the smaller section of parcel is positioned and pushed against the bars assuming that the parcel in not too long to be sled into the APL. When a carrier agent initiates sliding a parcel in the APL, the combined information, received from the sensors corresponding to bars in contact with the back of the parcel, allows the control system to determine the section of the parcel by running a shape detection software module. Based on the parcel section determination and on the deposit/collection plan and on the zoning optimization or on any other rules related to the operation of the APL, the controller 504 determines whether the carrier agent is trying to deposit the parcel in a forbidden area, as the bars facing the parcel undergo some pressure from the parcel being inserted in the APL, and this pressure is detected by the corresponding sensors 518*i*. If the parcel is being deposited in a forbidden area, the APL indicates to the carrier agent that the area is forbidden by actively holding in position the bars being pushed, eventually following on a limited retraction. Therefore, the APL forces the carrier agent to use another area. Preferably, the carrier agent is alerted in parallel by other user communication interface such as voice messages from the speaker 510 or messages on the graphical user interface 509, and is guided towards an appropriate area. The deposit variant described above related to a partially automatized mode is the main difference compared to a fully automatized mode, and this deposit variant impacts the acts 724 and 732 of the deposit-collection process illustrated on FIG. 8. The other acts of a deposit-collection process, as illustrated on FIG. 8, can apply to a partially automatized mode. An improvement in the validation of the parcel deposit in acts 228 and 238 of a deposit-collection process, as illustrated on FIG. 8, can be implemented as follows. Instead of verifying only the section of the parcel(s) being deposited, the controller 504 verifies the approximate volume of the parcel(s). The sensors 518*i* corresponding to bars in contact with the back of the parcel(s), allow the control system to determine the section of the parcel(s), and by measuring the retraction distance of the bars, the length of the parcel(s) is determined by the controller 504, and therefore the approximate volume of the parcel(s) is established.

In some cases, parcel lockers are installed in uncontrolled public areas where a lot of various persons pass by and the security of the parcels stored in the parcel lockers may become an issue. In such uncontrolled public areas, it may become critical to prevent unauthorized persons from removing parcels from an APL during a collection or a deposit by a carrier agent, while the closure is in a totally opened position. In order to respond to this issue, in another embodiment, the APL closure is not moved in a totally opened position during a deposit process or a collection process, but limited to partially opened positions, therefore preventing any illegitimate access for persons other than the carrier agent. The carrier agent does not have access at the same time to all the parcels for collection or deposit, but one after the other via the closure moving in partially opened position from one parcel to be collected to another one or from one temporary compartment to another one, where to deposit parcels. Compared to a deposit-collection process based on a totally opened position of the closure as illustrated on FIG. 8, a variant based on partially opened positions of the closure impacts the collection acts 706 and 708 and the deposit acts 724 to 738 of a deposit-collection process as illustrated on FIG. 8.

Regarding the collection, in a variant based on partially opened positions of the closure, once access to the APL is authorized for a carrier agent, the closure, which was in a totally closed position, moves to a partially opened position in front of a temporary compartment of a first parcel to be collected. The parcel to be collected does not have to be pushed partially for guiding the carrier agent. However, preferably, the APL pushes the parcel to be collected partially out for easing the removal by the carrier agent. Once, the carrier agent has removed the parcel, the bars corresponding to the removed parcel are fully extended and the closure moves to a partially opened position in front of a temporary compartment of a next parcel to be collected, and so on until the collection is completed. All other collection actions can be performed similarly to a collection process based on a totally opened position of the closure, including in particular the collection validation and the data update and the data transmission to the remote server system.

Figure 9:
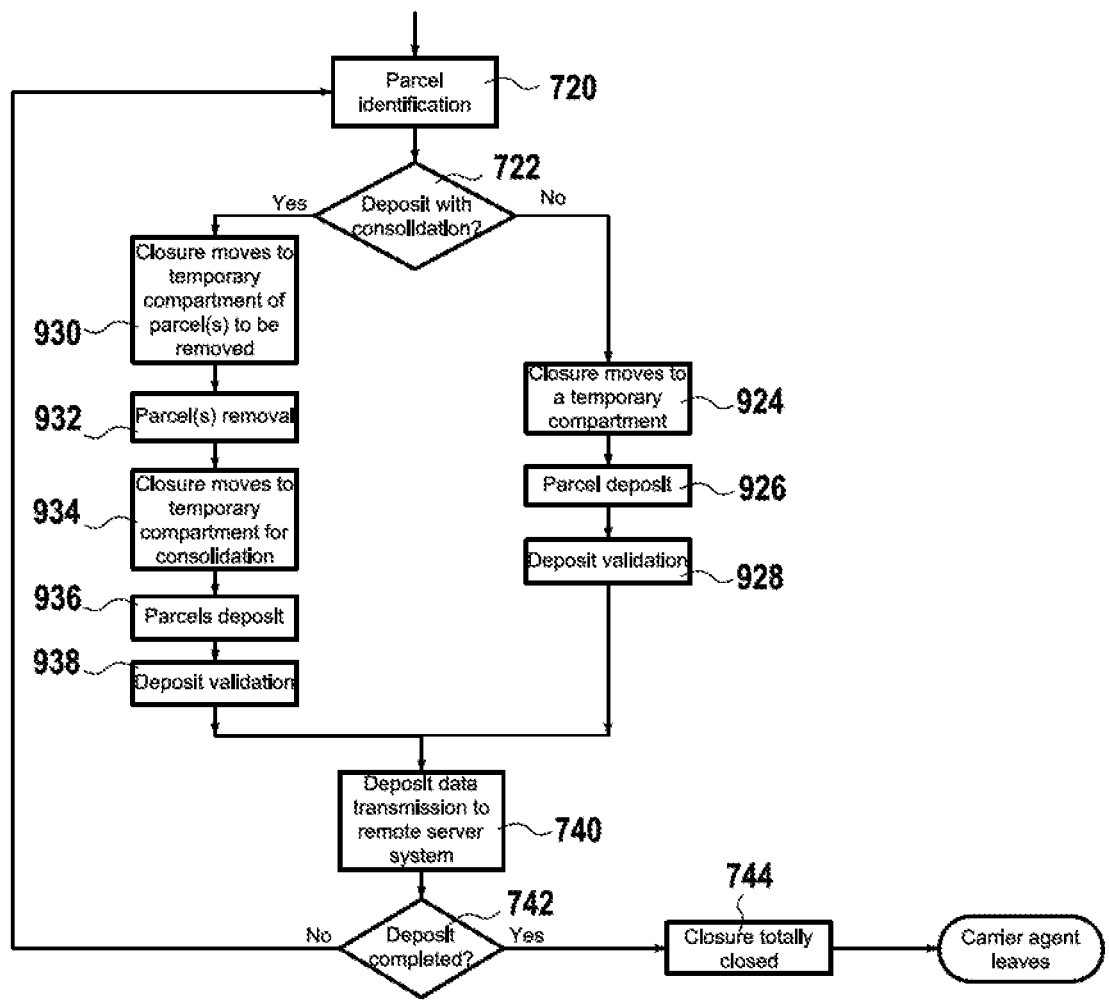
FIG. 9 depicts a flow diagram relative to parcel deposit by a carrier agent according to a variant based on partially opened positions of the closure.

FIG. 9 illustrates how parcels are deposited by a carrier agent according to a variant based on partially opened positions of the closure. The deposit can be prepared in a similar manner as for a deposit process based on a totally opened position of the closure (acts 716 and 718 of FIG. 7), and can be initiated by the identification of a first parcel that the carrier agent wants to deposit (act 720). Then, according to the deposit/collection plan established by the APL, the controller 504 prepares a new temporary compartment in case of simple deposit, and in case of a consolidation indicates in addition which parcel already deposited needs to be consolidated (act 722).

When no consolidation is required with the parcel that the carrier agent wants to deposit, the closure moves to a partially opened position in front of a temporary compartment, whose section corresponds to the section of the parcel that the carrier agent wants to deposit. This temporary compartment is identified by the controller 504 as an optimized location in the APL based on the dimensions of the parcels to be consolidated and on the optimized zoning and the parcel deposit/collection plan. The APL does not have to indicate to the carrier agent where to deposit the parcel by automatically retracting the bars of the temporary compartment as described in act 724 of FIG. 7. Preferably, the bars are not retracted so that, when the carrier agent slides the parcel into the temporary compartment, the contact of the parcel with the bars is secured for determining the section of the parcel (act 924). The carrier agent deposits the parcel by sliding it into the temporary compartment and pushing it against the bars in the back of the parcel (act 926). The controller 504 validates the deposit and preferably verifies the weight of the parcel and can verify the volume of the parcel. The sensor 522$i$ corresponding to bars under the parcel detect and measure the weight of the parcel deposited on top of them. The sensors 518$i$ corresponding to bars in contact with the back of the parcel, allow the control system to determine the section of the parcel, and by measuring the retraction distance of the bars, the length of the parcel is determined by the controller 504, and therefore the approximate volume of the parcel is established. In a simpler embodiment, these sensors simply detect and establish the presence of parcel in the temporary compartment. If the deposit is not validated by the controller, user communication interface of the APL, such as a graphical user interface 509 or loud speakers 510, alert the carrier agent regarding the invalid situation and guide the carrier agent for resolving the invalid situation. The closure remains in front of the temporary compartment waiting for the deposit of the expected parcel until the situation is resolved. Once the deposit is validated by the controller 504, preferably the APL informs the carrier agent regarding the valid situation via the user communication interface (act 928).

When a consolidation is required with the parcel that the carrier agent wants to deposit, the closure moves to a partially opened position in front of a temporary compartment, where the parcel(s) to be consolidated are stored (act 930). Preferably, the APL pushes the parcel(s) partially out for easing the removal by the carrier agent. The carrier agent removes the parcel(s) to be consolidated from the APL. Following on the parcel(s) removal, the nullification of the measured weight by the sensors 522$i$ validates the removal by the carrier agent. Once the parcel removal is validated, the bars corresponding to the removed parcel(s) are fully extended by the actuators 512$i$ (act 932). The closure moves to a partially opened position in front of a temporary compartment, whose section corresponds to the section of the parcels to be consolidated. This temporary compartment is identified by the controller 504 as an optimized location in the APL based on the dimensions of the parcels to be consolidated and on the optimized zoning and the parcel deposit/collection plan. Preferably, the bars corresponding to this temporary compartment are not retracted so that, when the carrier agent slides the parcels into the temporary compartment, the contact of the parcels with the bars is secured for determining the section of the parcels (act 934). The carrier agent deposits the parcels to be consolidated by sliding them into the temporary compartment and pushing them against the bars in the back of the parcels. Preferably, the user communication interface, such as the graphical user interface 509 or the loud speakers 510 guide the carrier agent on how to group the consolidated parcels for fitting them into the temporary compartment (act 936). The controller 504 validates the deposit and preferably verifies the weight of the parcels and can verify the volume of the parcels. The sensors 522$i$ corresponding to bars under the parcels detect and measure the weight of the parcels deposited on top of them. The sensors 518$i$ corresponding to bars in contact with the back of the parcels, allow the control system to determine the combined section of the parcels, and by measuring the retraction distance of the bars, the length of the parcels is determined by the controller 504, and therefore the approximate volume of the parcels is established. In a simpler embodiment, these sensors simply detect and establish the presence of parcels in the temporary compartment. If the deposit is not validated by the controller, user communication interface of the APL, such as the graphical user interface 509 or the loud speakers 510, alert the carrier agent regarding the invalid situation and guide the carrier agent for resolving the invalid situation. The closure remains in front of the temporary compartment waiting for the deposit of the expected parcels until the situation is resolved. Once the deposit is validated by the controller 504, preferably the APL informs the carrier agent regarding the valid situation via the user communication interface (act 938).

All following deposit actions can be performed similarly to a deposit process based on a totally opened position of the closure. The APL logs and updates information data relative to the parcels deposit and consolidation. Eventually, the APL transmits to the remote server system data regarding the parcels deposit and consolidation and preferably any operation information of the APL (act 740). Each time the carrier agent takes a new parcel for depositing it in the APL, the deposit process resumes from act 720 (act 742). Once all deposits are performed or if the APL is filled before the end of deposit, the APL informs the carrier agent regarding of the end of the deposit process via the user communication interface. The closure moves to a totally closed position.

Preferably, the doors move to a central position in order to minimize the time for providing access to a deposited parcel for a recipient to come. Alternatively, in a further optimization, the doors move to a central position in reference with the different positions of the parcels deposited in the APL (act 744). A recipient authorization code is generated for each deposited parcel. Preferably, along the whole deposit and consolidation process, the user communication interface, such as the graphical user interface 509 or the loud speakers 510, are used for informing and guiding the carrier agent for operating the APL, for example for informing the carrier agent that he needs to remove a parcel due to be consolidated with the parcel that he wants to deposit.

Figure 10:
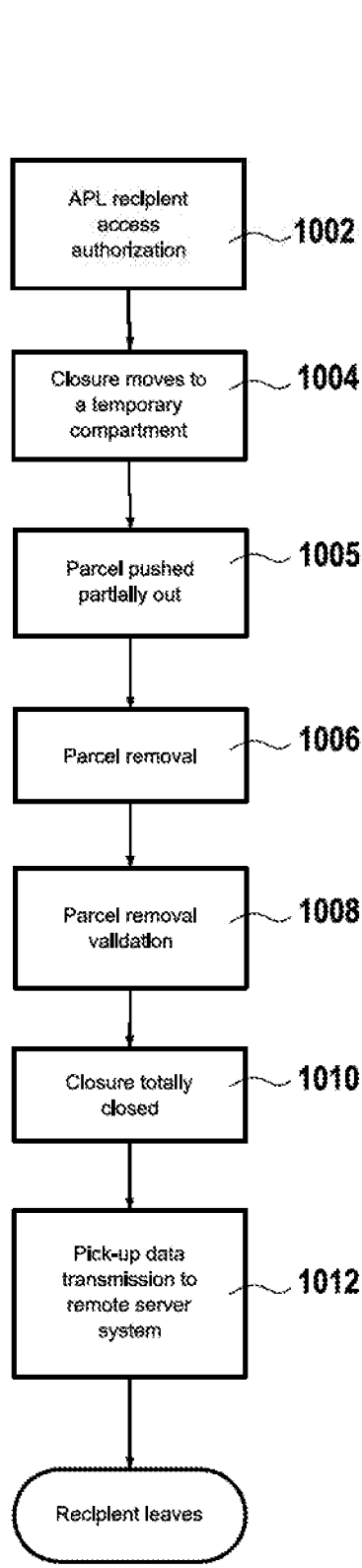
FIG. 10 illustrates a process for picking-up a parcel by a recipient in an adaptive parcel locker (APL) according to the invention.

FIG. 10 illustrates how a parcel is picked-up by a recipient in an APL according to the invention. In act 1002, the APL performs an authorization procedure for allowing access to the APL by checking a recipient authorization code provided by the recipient. The recipient authorization code can be provided to the APL in a multiplicity of manners including by reading a barcode with a reader 511 or by using a mobile device of the carrier agent as described in application EP16306329 or by entering it directly via a graphical user interface 509. Once access to the APL is authorized, the closure, which was in a totally closed position, moves to a partially opened position in front of a temporary compartment where the recipient parcel is stored. During the travelling of the two couple of doors, the edges of the couple of doors external to the APL are maintained contiguous. Once the door edges are positioned in front of the temporary compartment, the doors slide so that the closure takes the partially opened position providing access to the temporary compartment volume for the recipient to retrieve his parcel (act 1004). Preferably, the APL pushes the parcel partially out for easing the removal by the recipient (act 1005). The recipient removes the parcel from the APL. The bar rows delimiting the temporary compartment are actively held in their extended position, and therefore provide a barrier during a parcel pick-up preventing the recipient from accessing any parcel other than his parcel (act 1006). Following on the parcel removal, the nullification of the measured weight by the sensors 522*i* validates the removal by the recipient. Once the parcel removal is validated, the bars corresponding to the removed parcel are fully extended by the corresponding actuators 512*i* (act 1008). Following on the completion of the parcel removal, the closure moves to a totally closed position. Preferably, the doors move to a central position in order to minimize the time for providing access to a deposited parcel for a recipient to come. Alternatively, in a further optimization, the doors move to a central position in reference with the different positions of the parcels deposited in the APL (act 1010). The APL logs and updates information data relative to the parcel pick-up. Eventually, the APL transmits to a remote server system data regarding the parcel pick-up and preferably any operation information of the APL (act 1012).

Return and drop-off processes also can be supported by an APL. A return process is needed when a recipient wants to return the product that was shipped to him. A drop-off process supports a shipper or a seller (called shipper thereafter) who wants to ship a parcel via a parcel locker where he drops-off the parcel for a carrier to take charge of the shipping of the parcel. For both processes, an authorization code is required for a user (recipient or shipper) of the APL to access the APL for depositing a parcel (return or drop-off). In the case of a return process, the recipient is typically provided with a return label to be attached onto a return parcel. The return label typically comprises a return number, which may be used as an authorization code for accessing the APL. Alternatively, the recipient is provided with a specific authorization code for accessing the APL. Similarly, in the case of a drop-off process, the shipper is typically provided with a shipping label to be attached onto a parcel that he wants to ship. The shipping label typically comprises a shipping number, which may be used as an authorization code for accessing the APL. Alternatively, the shipper is provided with a specific authorization code for accessing the APL.

Figure 11:
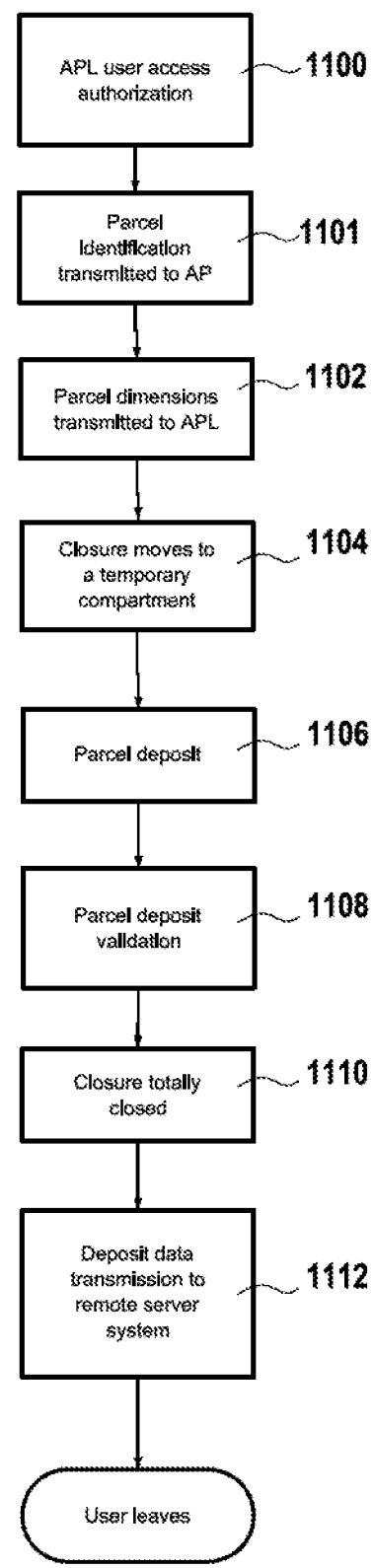
FIG. 11 illustrates a process for returning a parcel by a recipient or for dropping-off a parcel by a shipper with an adaptive parcel locker (APL) according to the invention.

FIG. 11 illustrates how a parcel, according to the invention, is either returned by a recipient via an APL or dropped-off by a shipper in an APL. In act 1100, the APL performs an authorization procedure for allowing access to the APL by checking an authorization code provided by the user. The authorization code can be provided to the APL in a multiplicity of manners including by reading a barcode with a reader 511 or by using a mobile device of the user as described in application EP16306329 or by entering it directly via a graphical user interface 509. Once access to the APL is authorized, an identification of the parcel is transmitted to the APL. This parcel identification, depending on the invention embodiment, can be printed on the parcel label (return label or shipping label) in the form of a barcode and captured by the barcode reader 511 or can be comprised in a RFID tag affixed onto the parcel and read by a RFID reader connected with the APL or can be captured by a mobile device of the user and transmitted from the mobile device to the APL as described in application EP16306329 or can be directly entered by the user via the graphical user interface 509 (act 1101). Alternatively, when the parcel identification serves as an authorization code, this act is not required. The parcel dimensions can be transmitted to the APL with the authorization code or with the parcel identification, or may have been transmitted previously from a remote server system. Alternatively, the parcel dimensions can be directly entered by the user via the graphical user interface 509 (act 1102). Based on the dimensions of the parcel, the controller 504 identifies an optimized location in the APL where it defines a temporary compartment. The closure, which was in a totally closed position, moves to a partially opened position in front of the temporary compartment, whose section corresponds to the section of the parcel that the user wants to deposit. During the travelling of the two couple of doors, the edges of the couple of doors external to the APL are maintained contiguous. Once the door edges are positioned in front of the temporary compartment, the doors slide so that the closure takes a partially opened position providing access to the temporary compartment volume for the user to deposit his parcel. Preferably, the bars are not retracted so that, when the user slides the parcel into the temporary compartment, the contact of the parcel with the bars is secured for determining the section of the parcel (act 1104). The user deposits the parcel by sliding it into the temporary compartment and pushing it against the bars in the back of the parcel. The bar rows delimiting the temporary compartment are actively held in their extended position, and therefore provide a barrier during a parcel deposit preventing the recipient from accessing any parcel already stored in the APL (act 1106). The controller 504 validates the deposit and preferably verifies the weight of the parcel and can verify the volume of the parcel. The sensor 522*i* corresponding to bars under the parcel detect and measure the weight of the parcel deposited on top of them. The sensors 518*i* corresponding to bars in contact with the back of the parcel, allow the control system to determine the section of the parcel, and by measuring the retraction distance of the bars, the length of the parcel is determined by the controller 504, and therefore the approximate volume of the parcel is established. In a simpler embodiment, these sensors simply detect and establish the presence of parcel in the temporary compartment. If the deposit is not validated by the controller, user communication interface of the APL, such as the graphical user interface 509 or loud speakers 510, alert the user regarding the invalid situation and guide the user for resolving the invalid situation. The closure remains in front of the temporary compartment waiting for the deposit of the expected parcel until the situation is resolved. Once the deposit is validated by the controller 504, preferably the APL informs the user regarding the valid situation via the user communication interface (act 1108). Following on the completion of the parcel deposit, the closure moves to a totally closed position. Preferably, the doors move to a central position in order to minimize the time for providing access to a temporary compartment for a user to come. Alternatively, in a further optimization, the doors move to a central position in reference with the different positions of the parcels deposited in the APL (act 1110). The APL logs and updates information data relative to the parcel deposit and the user. Eventually, the APL transmits to the remote server system data regarding the parcel deposit and user information, and preferably any operation information of APL (act 1112). Preferably, along the whole deposit process, the user communication interface, such as the graphical user interface 509 or the loud speakers 510, are used for informing and guiding the user for operating the APL, for example for informing the user, if required, that he needs to provide the identification or the dimensions of the parcel that he wants to deposit.

Although the embodiments of the invention covered in the patent description have been described for the particular application of parcel lockers, it is to be understood that the invention is not limited to the disclosed embodiments. The invention can in particular apply to storage equipment or vending machines. Moreover, although the invention has been described with respect to preferred embodiments thereof, it will be understood by those skilled in the art that the foregoing and various other changes omissions and deviations in the form and detail thereof may be made without departing from the spirit and scope of this invention.

The invention claimed is:

1. An electronic parcel locker comprising:
   an outside enclosure constituted of two side panels, of a bottom panel, of a top panel and of a back panel fastened together and defining a front aperture of said electronic parcel locker, and
   an internal structure for supporting parcels deposited in said electronic parcel locker,
   wherein said internal structure is constituted of an array of bars with a same length regularly aligned essentially perpendicularly to said back panel and selectively movable between extended positions where a front end of said array of bars is aligned with said front aperture of said electronic parcel locker, and retractable positions where bars of said array of bars corresponding to shapes of parcels to be deposited in said electronic parcel locker are retractable towards said back panel for defining temporary compartments exactly adapted to said shapes of parcels.

2. The electronic parcel locker according to claim 1, wherein said bars of said array of bars are aligned vertically and horizontally, and are touching or almost touching each other's side, and axes of the bars are inclined slightly upwards from the back panel.

3. The electronic parcel locker according to claim 1, wherein said array of bars is constituted of one of the following structure: bars with a circular section, bars with a T section, bars with a hexagonal section in a honeycomb geometry, flat bars with elongated rectangular sections regularly positioned vertically, rows of flat bars alternatively positioned horizontally and vertically where said flat bars positioned vertically have their top side aligned with top sides of said flat bars positioned horizontally so as to participate in supporting a parcel deposited on said top sides of said flat bars positioned horizontally.

4. The electronic parcel locker according to claim 1, wherein said internal structure further comprises:
   actuators configured for actively maintaining in said extended positions horizontal and vertical rows of said bars delimiting said temporary compartment for a deposited parcel,
   retraction sensors each of which being associated with one bar and wherein said retraction sensors are configured for communicating with a controller for detecting said bars in a retracted position towards said back panel away from said extended position, wherein said retraction sensors are pressure sensors detecting and measuring pressure applied against ends of said bars,
   position sensors each of which being associated with one bar and wherein said position sensors are configured for communicating with said controller for measuring a retraction distance of said associated bar, and
   weight sensors each of which being associated with one bar and wherein said weight sensors are configured for communicating with said controller for detecting or measuring pressure applied onto said bars when said parcel is deposited onto said one bar.

5. The electronic parcel locker according to claim 1, wherein said bars are configured for freely sliding towards said back panel under a pressure of said parcel being pushed against said bars.

6. The electronic parcel locker according to claim 1, further comprising a closure for said front aperture constituted of four doors organized in two first doors sliding horizontally in a first vertical plane and in two second doors sliding vertically in a second vertical plane, wherein said two first doors is positioned immediately near said two second doors, and wherein each of said four doors has a surface at least equal to a surface of said front aperture.

7. The electronic parcel locker according to claim 6, wherein said closure is further constituted of a horizontal bottom sliding guide and of a horizontal top sliding guide defining a horizontal sliding movement of said two first doors and of a vertical left sliding guide and of a vertical right sliding guide defining a vertical sliding movement of said two second doors.

8. The electronic parcel locker according to claim 7, wherein said two first doors are articulated and are constituted of blades with a longitudinal dimension equal to a height of said two first doors and in that said two second doors are articulated and are constituted of blades with a longitudinal dimension equal to a width of said two second doors.

9. The electronic parcel locker according to claim 8, wherein said closure is further constituted of motorized axis positioned near each edge of said front aperture and driving a wrapping of each of said four doors.

10. The electronic parcel locker according to claim 8, wherein said closure is further constituted of horizontal sliding guide sections prolonging said horizontal bottom sliding guide and said horizontal top sliding guide for directing said two first doors for wrapping around said internal structure and of second sliding guide sections prolonging said vertical left sliding guide and said vertical right sliding guide for directing said two second doors for wrapping around said internal structure wherein sliding sections parallel to and near said back panel among said horizontal sliding guide sections are parallel and wherein sliding sections parallel to and near said back panel among said second sliding guide sections are parallel.

11. A method for parcel deposit into or parcel removal from an electronic parcel locker constituted of two side panels, of a bottom panel, of a top panel and of a back panel fastened together and defining a front aperture of said electronic parcel locker, and of an array of bars with a same length regularly aligned essentially perpendicularly to said back panel and selectively movable between extended positions and retractable positions, the method including depositing a parcel by selectively moving from said extended positions, where a front end of said array of bars is aligned with said front aperture, to said retractable positions where bars of said array of bars corresponding to a shape of the parcel to be deposited in said electronic parcel locker are retracted towards said back panel for defining a temporary compartment exactly adapted to said shape of the parcel.

12. The method for parcel deposit into or parcel removal from an electronic parcel locker according to claim 11, further including actively maintaining in said extended position, by actuators, rows of said bars delimiting said temporary compartment during a deposit or a removal.

13. The method for parcel deposit into or parcel removal from an electronic parcel locker according to claim 11, further including:
  pushing partially out said parcel with said bars set in motion by actuators for guiding removal of said parcel,
  after a validated removal of said parcel, the validated removal validated by a controller, moving said bars in said extended positions, and
  as long as removal of said parcels is not completed, actively maintaining in said extended positions said bars which were in said extended positions previously to initiating removal of said parcel.

14. The method for parcel deposit into or parcel removal from an electronic parcel locker according to claim 11, further including:
  retracting said bars according to a length of said parcel for depositing said parcel, and
  as long as deposit of said parcels is not validated by a controller, actively maintaining in said extended positions, by actuators, said bars which were in said extended positions previously to initiating deposit of said parcel.

15. The method for parcel deposit into or parcel removal from an electronic parcel locker according to claim 11, further including determining a size of said parcel deposited in front of a group of said bars by calculating a section of said parcel based on said group of said bars detected by retraction sensors and by calculating a length of said parcel based on a retraction distance of said group of said bars measured by position sensors.

* * * * *